(12) United States Patent
Yoshida et al.

(10) Patent No.: US 12,306,109 B2
(45) Date of Patent: May 20, 2025

(54) INSPECTION CONDITION PRESENTATION APPARATUS, SURFACE INSPECTION APPARATUS, INSPECTION CONDITION PRESENTATION METHOD AND PROGRAM

(71) Applicant: Resonac Corporation, Tokyo (JP)

(72) Inventors: Katsuhisa Yoshida, Tokyo (JP); Yoshishige Okuno, Tokyo (JP); Shuji Hatada, Chiba (JP); Kazunori Ohashi, Chiba (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/257,685

(22) PCT Filed: Nov. 7, 2022

(86) PCT No.: PCT/JP2022/041296
§ 371 (c)(1),
(2) Date: Jun. 15, 2023

(87) PCT Pub. No.: WO2023/085217
PCT Pub. Date: May 19, 2023

(65) Prior Publication Data
US 2024/0027359 A1 Jan. 25, 2024

(30) Foreign Application Priority Data
Nov. 15, 2021 (JP) ................................. 2021-185472

(51) Int. Cl.
*G01N 21/88* (2006.01)
*G01N 21/95* (2006.01)
*G01N 21/956* (2006.01)

(52) U.S. Cl.
CPC ..... *G01N 21/8806* (2013.01); *G01N 21/9501* (2013.01); *G01N 21/956* (2013.01); *G01N 2021/8845* (2013.01); *G01N 2021/8848* (2013.01)

(58) Field of Classification Search
CPC ........... G01N 21/8806; G01N 21/9501; G01N 21/956; G01N 2021/8845; G01N 2021/8848; G01N 21/8851
USPC ...................................................... 356/237.4
See application file for complete search history.

(56) References Cited

U.S. PATENT DOCUMENTS

| | | | | |
|---|---|---|---|---|
| 4,139,307 A * | 2/1979 | Clarke | ............... | G01N 21/8901 356/431 |
| 2004/0169851 A1* | 9/2004 | Yang | .................... | G01N 21/956 356/237.2 |
| 2010/0225904 A1* | 9/2010 | Oshima | .............. | G01N 21/9501 356/237.2 |

FOREIGN PATENT DOCUMENTS

| | | |
|---|---|---|
| CN | 110911298 | 3/2020 |
| CN | 112213331 | 1/2021 |
| JP | H08-220003 | 8/1996 |
| JP | 2000-162141 | 6/2000 |

(Continued)

*Primary Examiner* — Seung C Sohn
(74) *Attorney, Agent, or Firm* — IPUSA, PLLC

(57) ABSTRACT

An inspection condition presentation apparatus includes an intensity calculation part configured to calculate an intensity distribution of scattered light when inspection light is irradiated on a surface of an inspection target on which scatterers of different types are present according to a plurality of incidence condition candidates, and an incidence condition presentation part configured to present, to a user, an incidence condition candidate with which an intensity of the scattered light becomes a maximum, among the plurality of incidence condition candidates.

12 Claims, 17 Drawing Sheets

(56) References Cited

FOREIGN PATENT DOCUMENTS

| | | |
|---|---|---|
| JP | 2006-170908 | 6/2006 |
| JP | 2010-101714 | 5/2010 |
| JP | 2019-516065 | 6/2019 |
| WO | 2012/153652 | 11/2012 |

* cited by examiner

INSPECTION CONDITION PRESENTATION APPARATUS, SURFACE INSPECTION APPARATUS, INSPECTION CONDITION PRESENTATION METHOD AND PROGRAM

TECHNICAL FIELD

The present invention relates to inspection condition presentation apparatuses, surface inspection apparatuses, inspection condition presentation methods and programs.

BACKGROUND ART

There is an optical defect detection technique for detecting a defect generated on a surface, using light that is reflected when laser light or the like is irradiated on a metal substrate, a semiconductor wafer, or the like. For example, Patent Document 1 describes a surface defect inspection technique for distinguishing concavo-convex of the defect on the surface of an object to be inspected, from light that is reflected when the light is irradiated on the surface of the object to be inspected at a predetermined incident angle. In addition, Patent Document 2, for example, describes a defect inspection technique for automatically discriminating between a foreign substance and a scratch present on a surface to be inspected, using a plurality of irradiation devices and a large number of light receiving devices.

PRIOR ART DOCUMENTS

Patent Documents

Patent Document 1: Japanese Laid-Open Patent Publication No. H8-220003
Patent Document 2: Japanese Laid-Open Patent Publication No. 2000-162141

DISCLOSURE OF THE INVENTION

Problems to be Solved by the Invention

However, according to the invention described in Patent Document 1, although the defect on the surface of the object to be inspected can be detected using a simple configuration including a single light source, and the concavo-convex of the defect can be distinguished, it is not possible to determine the type of the defect. Further, according to the invention described in Patent Document 2, although the type of the defect present on the surface to be inspected can be determined, it is necessary to use a complex configuration including a large number of optical devices. That is, according to the conventional surface defect inspection techniques, there is a problem in that it is difficult to determine the type of the defect using a simple configuration including a small number of optical devices.

One object of the present disclosure is to present an inspection condition for efficiently detecting a scatterer present on a surface of an inspection target depending on type.

Means for Solving the Problem

The present disclosure includes the following configurations.

[1] An inspection condition presentation apparatus comprising:
an intensity calculation part configured to calculate an intensity distribution of scattered light when inspection light is irradiated on a surface of an inspection target on which scatterers of different types are present according to a plurality of incidence condition candidates; and
an incidence condition presentation part configured to present, to a user, an incidence condition candidate with which an intensity of the scattered light becomes a maximum.

[2] The inspection condition presentation apparatus according to [1], wherein the incidence condition candidates include at least one of an incident angle of the inspection light with respect to the surface, a type of polarization of the inspection light, and a wavelength of the inspection light.

[3] The inspection condition presentation apparatus according to [2], further comprising:
an incidence condition reception part configured to receive an incidence condition instructed by the user in response to the incidence condition candidate presented to the user;
a first distribution calculation part configured to calculate a first distribution that is an intensity distribution of the scattered light when the inspection light is irradiated on the surface on which a first type of scatterer is present according to the incidence condition;
a second distribution calculator configured to calculate a second distribution that is an intensity distribution of the scattered light when the inspection light is irradiated on the surface on which a second type of scatterer is present according to the incidence condition;
a difference calculation part configured to calculate a difference between the first distribution and the second distribution;
a coordinate acquisition part configured to acquire coordinates indicating an extreme value of the difference; and
a detection condition presentation part configured to present a detection condition candidate of the scattered light to the user based on an arrangement of the coordinates.

[4] The inspection condition presentation apparatus according to [3], wherein
the detection condition candidate includes a scatterer presence or absence detection position candidate that is a detection position for determining presence or absence of the scatterer, and
the detection condition presentation part is configured to present, as the scatterer presence or absence detection position candidate, coordinates at which the intensity of the scattered light is high and in common to the first distribution and the second distribution.

[5] The inspection condition presentation apparatus according to [4], wherein
the detection condition candidate includes a scatterer type detection position candidate that is a detection position for determining the type of scatterer, and
the detection condition presentation part is configured to present, as the scatterer type detection position candidate, coordinates at which the type of scatterer can be determined using a minimum number of detection positions.

[6] The inspection condition presentation apparatus according to [5], wherein
the inspection target is a semiconductor wafer or a flat metal, and
the type of scatterer includes a particle adhered to the surface, and a fine protrusion, a scratch, and a pit generated at the surface.

[7] A surface inspection apparatus comprising:
an incidence condition determination part configured to determine the incidence condition candidate presented by the inspection condition presentation apparatus according to [5] as an incidence condition;
a detection condition determination part configured to determine the scatterer presence or absence detection position candidate and the scatterer type detection position candidate presented by the inspection condition presentation apparatus according to [5] as a scatterer presence or absence detection position and a scatterer type detection position;
an irradiation part configured to irradiate the inspection light on the surface of the inspection target according to the incidence condition;
a detection part configured to detect the scattered light when the inspection light irradiates the surface at the scatterer presence or absence detection position and the scatterer type detection position; and
a scatterer determination part configured to determine a presence or absence of the scatterer based on the scattered light detected at the scatterer presence or absence detection position by the detection part, and determine the type of scatterer based on the scattered light detected at the scatterer type detection position by the detection part.

[8] An inspection condition presentation method implemented by a computer to perform:
an intensity calculation procedure that calculates an intensity distribution of scattered light when inspection light is irradiated on a surface of an inspection target in which scatterers of different types are present according to a plurality of incidence condition candidates; and
an incidence condition presenting procedure that presents, to a user, an incidence condition candidate in which an intensity of the scattered light becomes a maximum.

[9] A program causing a computer to execute:
an intensity calculation procedure to calculate an intensity distribution of scattered light when inspection light is irradiated on a surface of an inspection target in which scatterers of different types are present according to a plurality of incidence condition candidates; and
an incidence condition presenting procedure to present, to a user, an incidence condition candidate in which an intensity of the scattered light becomes a maximum.

Effects of the Invention

According to the present disclosure, it is possible to present an inspection condition for efficiently detecting a scatterer present on a surface of an inspection target depending on type.

MODE OF CARRYING OUT THE INVENTION

Figure 1:
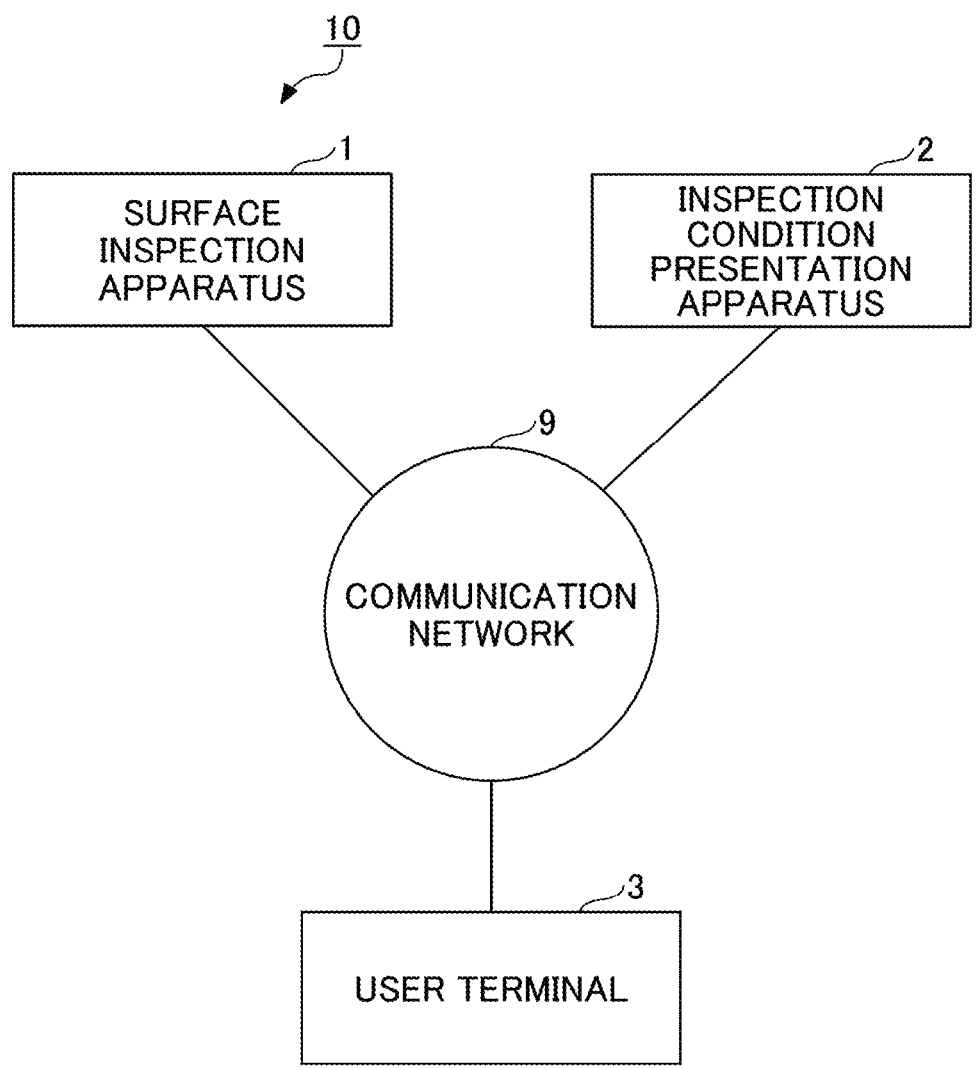
FIG. 1 is a diagram illustrating an example of an overall configuration of a surface inspection system according to a first embodiment.

Hereinafter, embodiments of the present invention will be described with reference to the accompanying drawings. In the present specification and the drawings, constituent elements having substantially the same functional configuration are designated by the same reference numerals, and redundant description thereof will be omitted.

First Embodiment

A first embodiment of the present invention relates to a surface inspection system that detects a scatterer present on a surface of an inspection target, based on scattered light when inspection light, such as laser light or the like, is irradiated on the surface of the inspection target. The surface inspection system according to the present embodiment includes a surface inspection apparatus that inspects the surface of the inspection target, and an inspection condition presentation apparatus that presents an inspection condition representing a setting of an optical system included in the surface inspection apparatus.

An example of the inspection target in the present embodiment is a semiconductor wafer or a flat metal. In addition, a scatterer to be detected in the present embodiment is a fine concavo-convex structure present on a surface of the inspection target. An example of the fine convex structure is a particle (hereinafter, also referred to as a "flat particle") adhered to the surface of the inspection target or a defect, such as a fine protrusion or the like, generated on the surface of the inspection target. An example of the fine concave structure is a scratch, or a defect, such as a pit or the like, generated at the surface of the inspection target. However, the inspection target and the scatterer described above are merely examples, and the inspection target and the scatterer are not limited to those described above.

An inspection condition in the present embodiment includes an incidence condition for irradiating inspection light on the surface of the inspection target, and a detection condition for detecting scattered light generated at the surface of the inspection target. The incidence condition includes an incident angle, a wavelength, and polarization of the inspection light. The detection condition includes a scatterer presence or absence determination position, and a scatterer type determination position. The scatterer presence or absence determination position refers to a position where the scattered light is detected in order to determine whether or not the scatterer is present at the surface of the inspection target. The scatterer type determination position refers to a position where the scattered light is detected in order to determine the type of scatterer present at the surface of the inspection target. That is, the inspection condition in the present embodiment is an inspection condition for simultaneously determining the presence or absence of the scatterer and the type of scatterer.

The scattered light generated due to the scatterer has an anisotropy depending on the type of scatterer. The surface inspection system according to the present embodiment performs a numerical analysis with respect to an intensity distribution of the scattered light obtained for each type of scatterer, to present the inspection condition under which the anisotropy of the scattered light becomes conspicuous. In particular, the surface inspection system according to the present embodiment presents the inspection condition under which the presence or absence of the scatterer and the type of scatterer can be determined using a minimum number of optical devices. Hence, according to the surface inspection system of the present embodiment, it is possible to efficiently and simultaneously determine the presence or absence of the scatterer and the type of scatterer using a small number of optical devices.

<Overall Configuration of Surface Inspection System>

First, an overall configuration of the surface inspection system according to the present embodiment will be described. FIG. 1 is a diagram illustrating an example of the overall configuration of the surface inspection system according to the present embodiment.

As illustrated in FIG. 1, a surface inspection system 10 of the present embodiment includes a surface inspection apparatus 1, an inspection condition presentation apparatus 2, and a user terminal 3. The surface inspection apparatus 1, the inspection condition presentation apparatus 2, and the user terminal 3 are communicably connected to one another via a communication network 9, such as a local area network (LAN), the Internet, or the like, so as to enable data communications.

The surface inspection apparatus 1 is an optical inspection apparatus that detects the scatterer present on the surface of the inspection target by irradiating inspection light, such as laser light or the like, on the surface of the inspection target. The surface inspection apparatus 1 irradiates the inspection light on the surface of the inspection target according to the incidence condition set by a user, and detects scattered light according to the detection condition set by the user. In addition, the surface inspection apparatus 1 determines whether or not the scatterer is present at the surface of the inspection target, and determines the type of scatterer when the scatterer is present, based on the detected scattered light, and outputs a determination result.

The inspection condition presentation apparatus 2 is an information processing device, such as a personal computer (PC), a workstation, a server, or the like, that presents an incidence condition candidate and a detection condition candidate to be set to the surface inspection apparatus 1. The inspection condition presentation apparatus 2 receives the type of scatterer to be detected, from the user terminal 3, and transmits the incidence condition candidate for the surface inspection apparatus 1 in order to irradiate the inspection light, to the user terminal 3. In addition, the inspection condition presentation apparatus 2 receives the incidence condition instructed by the user from the user terminal 3, and transmits the detection condition candidate for the surface inspection apparatus 1 in order to detect the scattered light, to the user terminal 3.

The user terminal 3 is an information processing terminal operated by the user, such as a PC, a tablet terminal, a smartphone, or the like. The user terminal 3 transmits the type of scatterer, that is to be detected and input by the user, to the inspection condition presentation apparatus 2. Moreover, the user terminal 3 outputs the incidence condition candidate and the detection condition candidate received from the inspection condition presentation apparatus 2, with respect to the user. Further, the user terminal 3 transmits the incidence condition, input by the user in response to the presented incidence condition candidate, to the inspection condition presentation apparatus 2.

The overall configuration of the surface inspection system 10 illustrated in FIG. 1 is merely an example, and various system configuration examples may be employed depending on the application and purpose thereof. For example, the inspection condition presentation apparatus 2 may be configured by a plurality of computers, or may be configured as a cloud computing service. In addition, the surface inspection system 10 may be configured by a stand-alone computer having functions to be included in the inspection condition presentation apparatus 2 and the user terminal 3, for example.

<Hardware Configuration of Surface Inspection System>

Next, a hardware configuration of the surface inspection system 10 according to the present embodiment will be described.

<<Hardware Configuration of Computer>>

Figure 2:
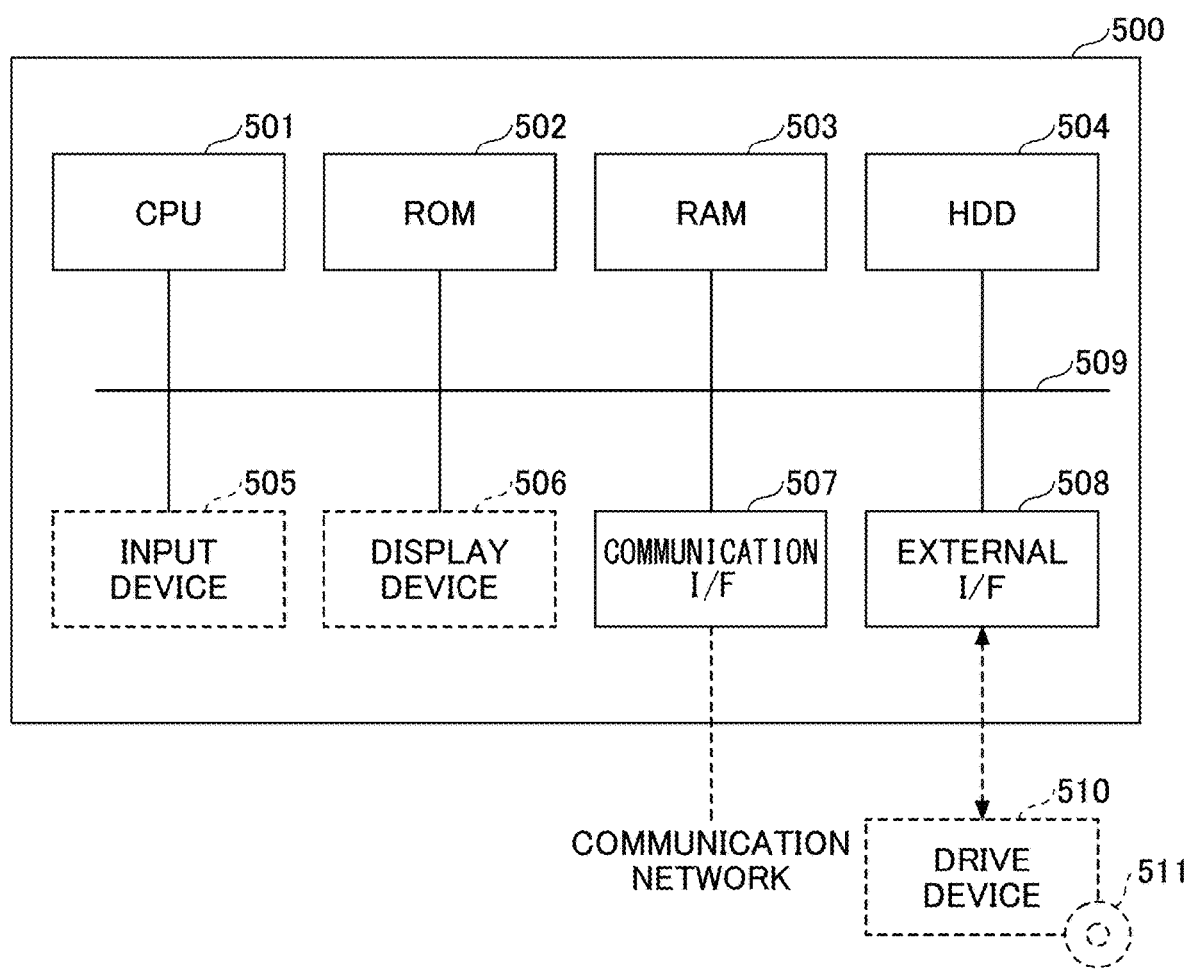
FIG. 2 is a diagram illustrating an example of a hardware configuration of a computer according to the first embodiment.

The inspection condition presentation apparatus 2 and the user terminal 3 of the present embodiment may be configured by a computer, for example. FIG. 2 is a diagram illustrating an example of a hardware configuration of a computer 500 according to the present embodiment.

As illustrated in FIG. 2, the computer 500 includes a central processing unit (CPU) 501, a read only memory (ROM) 502, a random access memory (RAM) 503, a hard disk drive (HDD) 504, an input device 505, a display device 506, a communication interface (I/F) 507, and an external I/F 508. The CPU 501, the ROM 502, and the RAM 503 form a so-called computer. Hardware components of the computer 500 are connected to one another via a bus line 509. The input device 505 and the display device 506 may be connected to the external I/F 508 and used.

The CPU 501 is an arithmetic device that reads a program and data from a storage device, such as the ROM 502, the HDD 504, or the like, into the RAM 503, and executes a process to control the entire computer 500 or to perform functions of the computer 500.

The ROM 502 is an example of a nonvolatile semiconductor memory (storage device) that can retain programs and data even when the power is turned off. The ROM 502 functions as a main storage device that stores various programs and data required by the CPU 501 to execute various programs installed in the HDD 504. More particularly, the ROM 502 stores a boot program such as a basic input output system (BIOS), an extensible firmware interface (EFI), or the like that is executed when booting the computer 500, and data of operating system (OS) settings, network settings, or the like.

The RAM 503 is an example of a volatile semiconductor memory (storage device) that stores programs and data that are erased when the power is turned off. The RAM 503 is a dynamic random access memory (DRAM), a static random access memory (SRAM), or the like, for example. The RAM 503 provides a work area to which the various programs installed in the HDD 504 are extracted when the CPU 501 executes the various programs.

The HDD 504 is an example of a nonvolatile storage device. The programs and the data stored in the HDD 504 include the operating system (OS) that is the basic software for controlling the entire computer 500, application programs that provide various functions by running on the OS, or the like. The computer 500 may use a storage device (for example, a solid state drive (SSD) or the like) using a flash memory as a storage medium, in place of the HDD 504.

The input device 505 is a touchscreen panel, an operation key or button, a keyboard, or mouse used by the user to input various signals, a microphone for inputting sound data such as voice, or the like.

The display device 506 includes a display, such as a liquid crystal display, an organic electroluminescent (EL) display, or the like that displays a screen, a speaker that outputs sound data such as voice or the like, or the like.

The communication I/F 507 is an interface for connecting to a communication network and enabling the computer 500 to perform the data communication.

The external I/F 508 is an interface with respect to an external device. The external device includes a drive device 510 or the like.

The drive device 510 is a device to which a recording medium 511 is set. The recording medium 511 includes a medium for optically, electrically, or magnetically recording information, such as a CD-ROM, a flexible disk, a magneto-optical disk, or the like. The recording medium 511 may include a semiconductor memory or the like that electrically records the information, such as the ROM, the flash memory, or the like. In this case, the computer 500 can read from and/or write to the recording medium 511 via the external I/F 508.

The various programs installed in the HDD 504 may be installed when the distributed recording medium 511 is set to the drive device 510 connected to the external I/F 508, and the various programs recorded in the recording medium 511 are read by the drive device 510, for example. Alternatively, the various programs installed in the HDD 504 may be installed by being downloaded from another network, different from the communication network, via the communication I/F 507.

<<Hardware Configuration of Surface Inspection Apparatus 1>>

Figure 3:
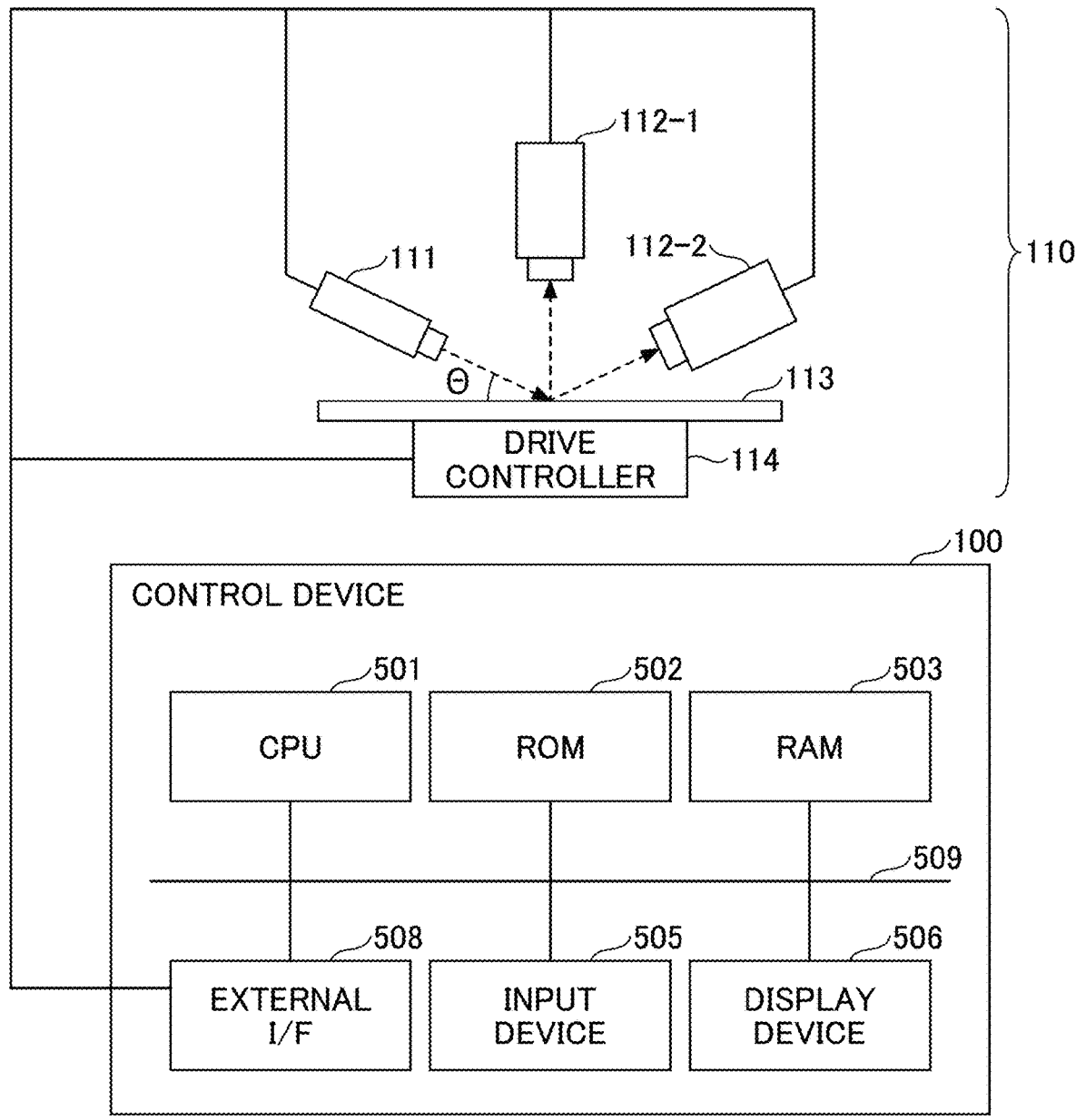
FIG. 3 is a diagram illustrating an example of a hardware configuration of a surface inspection apparatus according to the first embodiment.

FIG. 3 is a diagram illustrating an example of a hardware configuration of the surface inspection apparatus 1 according to the present embodiment. As illustrated in FIG. 3, the surface inspection apparatus 1 includes a control device 100, and an optical system 110. The optical system 110 of the present embodiment includes one or more irradiation devices 111 that irradiate inspection light, such as laser light or the like, one or more light receiving devices 112 that acquire scattered light generated at the surface of the inspection target, a table 113 on which the inspection target is placed, and a drive controller 114 that rotates or linearly moves the table 113. The light receiving device 112 of the present embodiment includes a light receiving device 112-1 for detecting upward scattered light, and a light receiving device 112-2 for detecting forward scattered light.

The irradiation device 111 has a function capable of setting an incident angle, a wavelength, and polarization of the inspection light. The incident angle refers to an angle $\theta$ formed by the inspection light and the surface of the inspection target. The polarization indicates an oscillation direction with respect to a plane of incidence. In particular, when a plane including incident light and reflected light reflected by the surface is defined as the plane of incidence, light oscillating in a direction parallel to the incident plane is called P-polarized light, and light oscillating in a direction perpendicular to the incident plane is called S-polarized light. In the present embodiment, a wavelength $\lambda$ is not limited, but is preferably in the infrared region to the ultraviolet region from a practical viewpoint.

The control device 100 of the present embodiment may be configured by a computer, for example. The control device 100 includes a CPU 501, a ROM 502, a RAM 503, an input device 505, a display device 506, and an external I/F 508. The CPU 501, the ROM 502, and the RAM 503 form the so-called computer. The hardware components of the computer 500 are connected to one another via a bus line 509. The input device 505 and the display device 506 may be configured to be used in a state connected to the external I/F 508.

The irradiation device 111, the light receiving device 112, and the drive controller 114 are connected to the external I/F 508, and are controlled by the control device 100. A signal representing the scattered light acquired by the light receiving device 112 is input to the control device 100 via the external I/F 508.

<Functional Configuration of Surface Inspection System>

Figure 4:
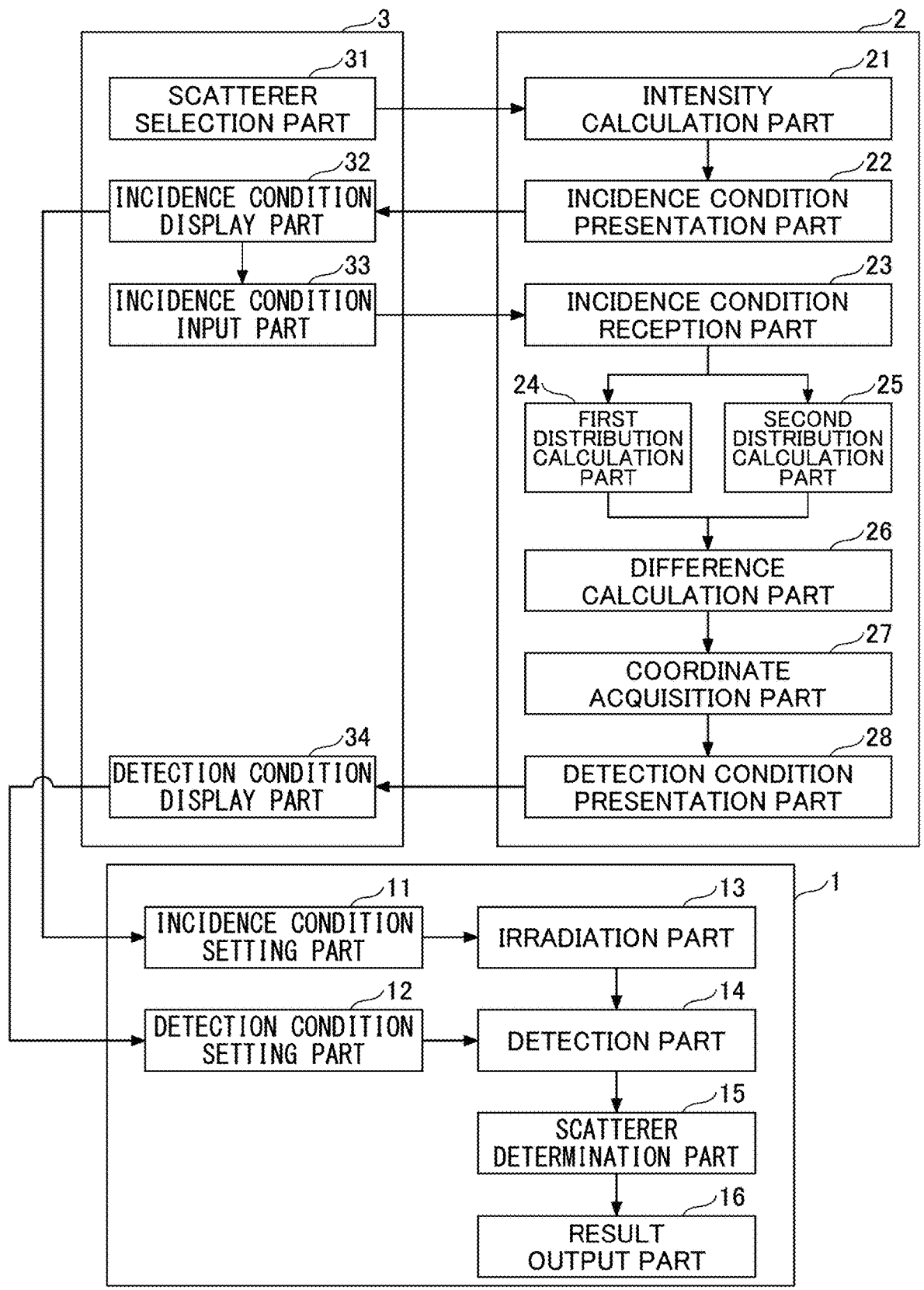
FIG. 4 is a diagram illustrating an example of a functional configuration of the surface inspection system according to the first embodiment.

Next, a functional configuration of the surface inspection system according to the present embodiment will be described. FIG. 4 is a diagram illustrating an example of a functional configuration of the surface inspection system 10 according to the present embodiment.

<<Functional Configuration of Inspection Condition Presentation Apparatus 2>>

As illustrated in FIG. 4, the inspection condition presentation apparatus 2 according to the present embodiment includes an intensity calculation part 21, an incidence condition presentation part 22, an incidence condition reception part 23, a first distribution calculation part 24, a second distribution calculation part 25, a difference calculation part 26, a coordinate acquisition part 27, and a detection condition presentation part 28.

The intensity calculation part 21, the incidence condition presentation part 22, the incidence condition reception part 23, the first distribution calculation part 24, the second distribution calculation part 25, the difference calculation part 26, the coordinate acquisition part 27, and the detection condition presentation part 28, included in the inspection condition presentation apparatus 2, may be configured by the CPU 501 in a case where the programs in the HDD 504 extracted to the RAM 503 illustrated in FIG. 2, when executed by the CPU 501, cause the CPU 501 to perform processes thereof.

The intensity calculation part 21 receives the two or more types of scatterers to be detected, from the user terminal 3. In addition, the intensity calculation part 21 calculates the intensity distribution of the scattered light when the inspection light is irradiated on the surface of the inspection target on which each type of scatterer to be detected is present, according to each of a plurality of predetermined incidence condition candidates.

The incidence condition presentation part 22 transmits, to the user terminal 3, the incidence condition candidate corresponding to an intensity distribution in which the intensity of the scattered light becomes a maximum, among the intensity distributions of the scattered light calculated by the intensity calculation part 21.

The incidence condition reception part 23 receives an incidence condition instructed by the user from the user terminal 3. The incidence condition reception part 23 sets the received incidence condition to the first distribution calculation part 24 and the second distribution calculation part 25.

The first distribution calculation part 24 calculates an intensity distribution (hereinafter, also referred to as a "first distribution") of scattered light when the inspection light is irradiated on the surface of the inspection target on which a first type of scatterer is present, according to the incidence condition received from the user terminal 3. The first type is one type included in the types of scatterers to be detected.

The second distribution calculation part. 25 calculates an intensity distribution (hereinafter also referred to as a "second distribution") of the scattered light when the inspection light is irradiated on the surface of the inspection target on which a second type scatterer is present, according to the incidence condition received from the user terminal 3. The second type is one type, different from the first type, among the types of scatterers to be detected.

The difference calculation part 26 calculates a difference between the first distribution calculated by the first distribution calculation part 24 and the second distribution calculated by the second distribution calculation part 25.

The coordinate acquisition part 27 acquires coordinates (hereinafter, also referred to as "extreme value coordinates") indicating a local maximum value or a local minimum value in the difference calculated by the difference calculation part 26.

The detection condition presentation part 28 generates the detection condition candidate based on an arrangement of the extreme value coordinates acquired by the coordinate acquisition part 27. In addition, the detection condition presentation part 28 transmits the generated detection condition candidate to the user terminal 3. In this state, the detection condition presentation part 28 includes common coordinates at which the intensity of the scattered light is high in both the first distribution and the second distribution, as a scatterer presence or absence detection position candidate, in the detection condition candidate. Moreover, the detection condition presentation part 28 includes extreme value coordinates at which the type of scatterer can be determined using a smallest number of detection positions, as a scatterer type detection position candidate, in the detection condition candidate.

<<Functional Configuration of User Terminal 3>>

As illustrated in FIG. 4, the user terminal 3 according to the present embodiment includes a scatterer selection part 31, an incidence condition display part 32, an incidence condition input part 33, and a detection condition display part 34.

The scatterer selection part 31, the incidence condition display part 32, the incidence condition input part 33, and the detection condition display part 34 included in the user terminal 3 may be configured by the CPU 501 in a case where the programs in the HDD 504 extracted to the RAM 503 illustrated in FIG. 2, when executed by the CPU 501, cause the CPU 501 to perform processes thereof.

The scatterer selection part 31 selects two or more types of scatterers to be detected, in response to a user operation. In addition, the scatterer selection part 31 transmits the selected types of scatterer to the inspection condition presentation apparatus 2.

The incidence condition display part 32 receives the incidence condition candidate from the inspection condition presentation apparatus 2. The incidence condition display part 32 outputs the received incidence condition candidate to the display device 506 or the like.

The incidence condition input part 33 receives an input of the incidence condition instructed by the user in response to the incidence condition display part 32 displaying the incidence condition candidate. In addition, the incidence condition input part 33 transmits the received incidence condition to the inspection condition presentation apparatus 2.

The detection condition display part 34 receives the detection condition candidate from the inspection condition presentation apparatus 2. Further, the detection condition display part 34 outputs the received detection condition candidate to the display device 506 or the like.

<<Functional Configuration of Surface Inspection Apparatus 1>>

As illustrated in FIG. 4, the surface inspection apparatus 1 according to the present embodiment includes the incidence condition setting part 11, the detection condition setting part 12, the irradiation part 13, the detection part 14, the scatterer determination part 15, and the result output part 16.

The incidence condition setting part 11, the detection condition setting part 12, the scatterer determination part 15, and the result output part 16 included in the surface inspection apparatus 1 may be configured by the CPU 501 in a case where the programs in the ROM 502 extracted to the RAM 503 illustrated in FIG. 3, when executed by the CPU 501, cause the CPU 501 to perform processes to control the irradiation device 111, the light receiving device 112, or the drive controller 114.

The incidence condition setting part 11 sets the incidence condition for irradiating the inspection light on the surface of the inspection target to the irradiation part 13, in response to a user operation. The incidence condition includes at least one of the incident angle of the inspection light with respect to the surface of the inspection target, the polarization type of the inspection light, and the wavelength of the inspection light.

The detection condition setting part 12 sets a detection condition for detecting the scattered light generated at the surface of the inspection target to the detection part 14, in response to a user operation. The detection condition includes a scatterer presence or absence detection position that is a detection position for determining the presence or absence of the scatterer, and a scatterer type detection position that is a detection position for determining the type of scatterer.

The irradiation part 13 irradiates the inspection light on the surface of the inspection target that is placed on the table 113, according to the incidence condition set by the incidence condition setting part 11.

The detection part 14 detects the scattered light generated at the surface of the inspection target that is placed on the table 113, according to the detection condition set by the detection condition setting part 12.

The scatterer determination part 15 determines the presence or absence of the scatterer and the type of scatterer, based on the scattered light detected by the detection part 14 according to the detection condition. In this state, the scatterer determination part 15 determines the presence or absence of the scatterer based on the scattered light detected at the scatterer presence or absence detection position. In addition, in a case where the presence of the scatterer is determined, the scatterer determination part 15 determines the type of scatterer based on the scattered light detected at the scatterer type detection position.

The result output part 16 outputs an inspection result indicating the presence or absence of the scatterer and the type of scatterer determined by the scatterer determination part 15, to the display device 506 or the like.

<<Functional Configuration of Test Condition Presentation Apparatus 2 Having Stand-Alone Configuration>>

As described above, the inspection condition presentation apparatus 2 and the user terminal 3 can be configured by the stand-alone computer. The inspection condition presentation apparatus 2 configured by the stand-alone computer does not need to include the incidence condition presentation part 22, the incidence condition reception part 23, and the detection condition presentation part 28, and need only include the scatterer selection part 31, the incidence condition display part 32, the incidence condition input part 33, and the detection condition display part 34.

<Procedure of inspection Condition Presentation Method>

Figure 5:
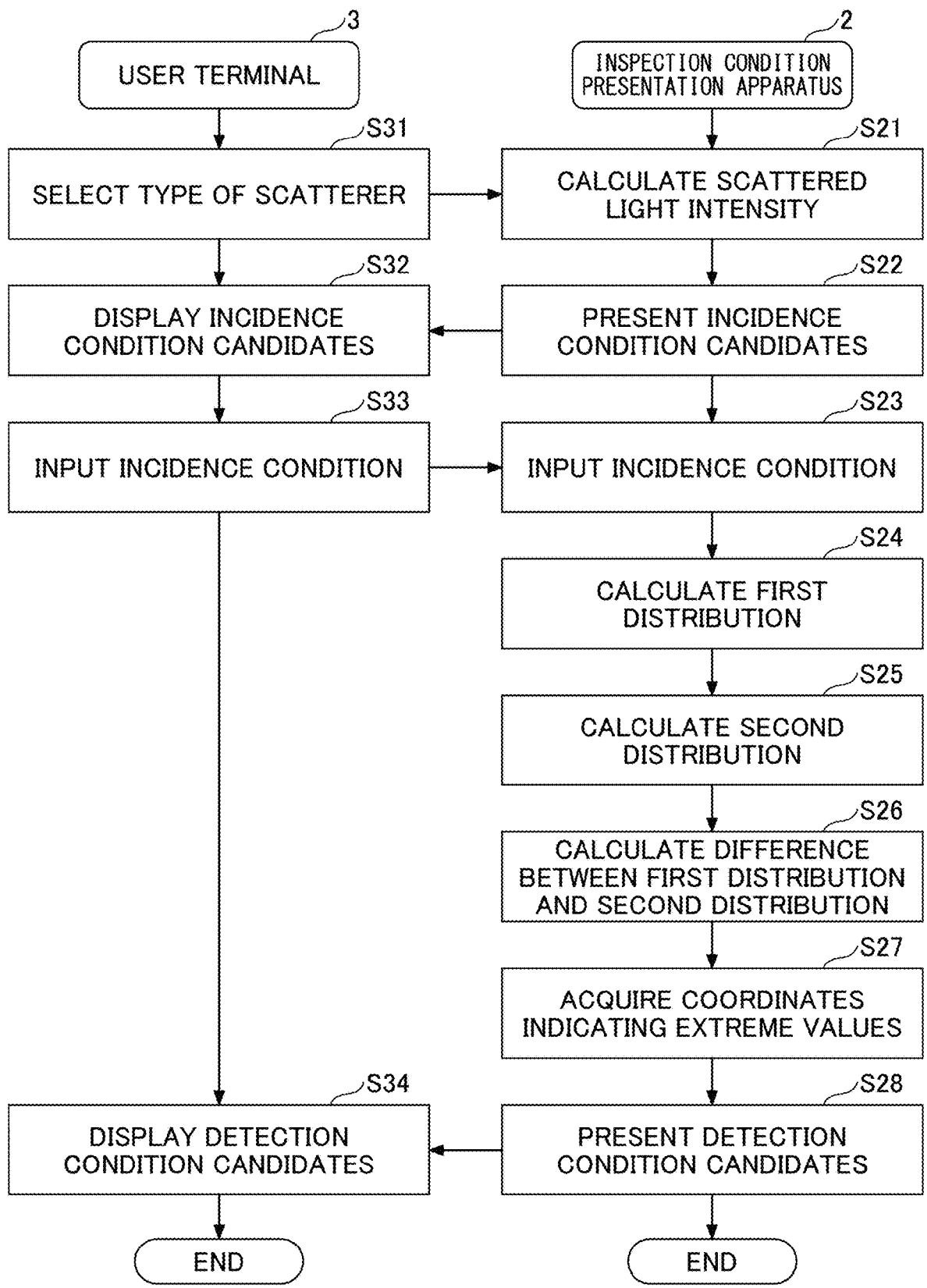
FIG. 5 is a flow chart illustrating an example of a procedure of an inspection condition presentation method according to the first embodiment.

Next, a procedure of an inspection condition presentation method executed by the surface inspection system according to the present embodiment will be described. FIG. 5 is a flow chart illustrating an example of the procedure of the inspection condition presentation method according to the present embodiment.

In step S31, the scatterer selection part 31 included in the user terminal 3 selects the two or more types of scatterers to be detected, in response to a user operation. Then, the scatterer selection part 31 transmits information indicating the selected types of scatterer to the inspection condition presentation apparatus 2.

Figure 6:
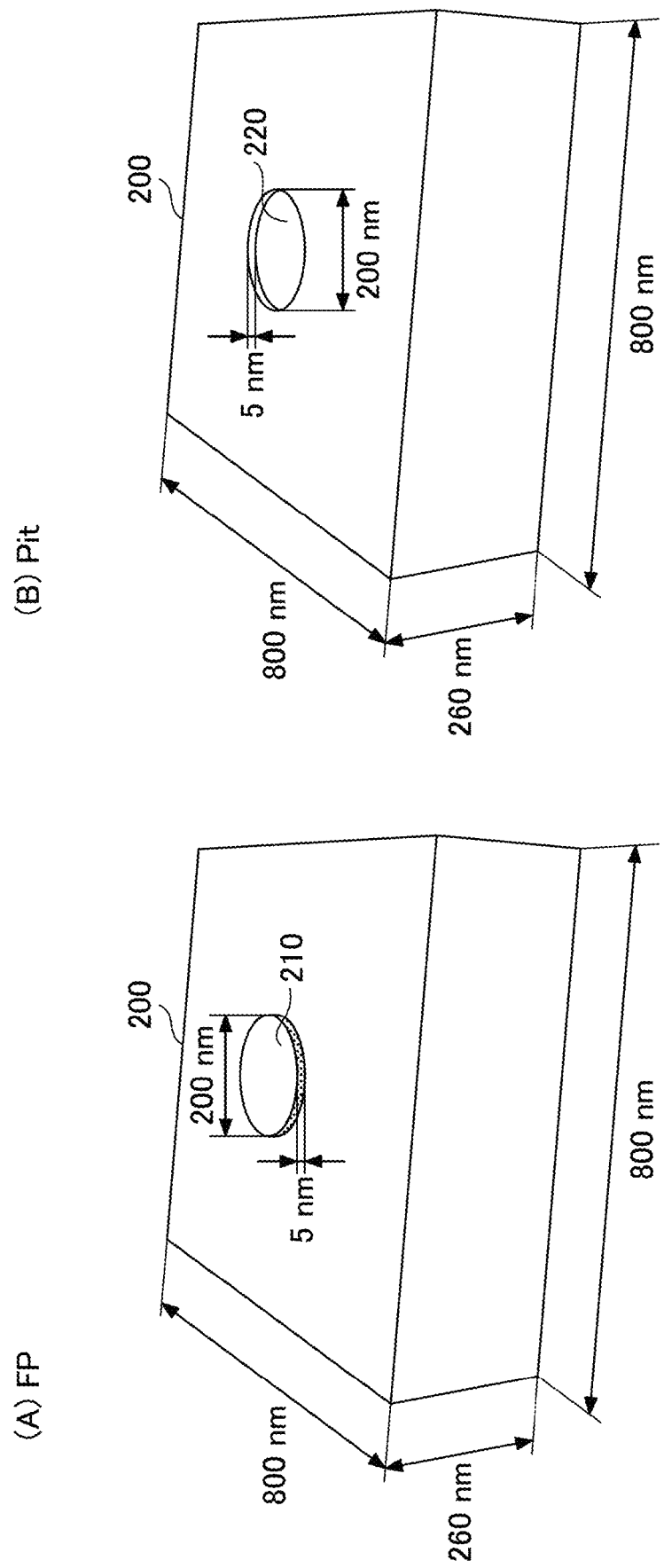
FIG. 6(A) is a diagram illustrating an example of a flat particle adhered to a surface of an inspection target.
FIG. 6(B) is a diagram illustrating an example of a pit generated at the surface of the inspection target.

FIG. 6 is a diagram illustrating examples of the types of scatterers to be detected. FIG. 6(A) is a diagram illustrating an example of the flat particle adhered to the surface of the inspection target. FIG. 6(B) is a diagram illustrating an example of the pit generated at the surface of the inspection target.

As illustrated in FIG. 6, the inspection target assumed in the present embodiment is a nickel (Ni) substrate 200 formed to a thickness of 260 nanometers (nm). In FIG. 6, the Ni substrate 200 is illustrated as having a length of 800 nm in the vertical and horizontal directions, which indicates the size of a sample surface to be inspected by one surface inspection, used in a simulation which will be described later, and does not indicate the actual size of the entire inspection target, and is not necessarily the same as the size of the sample surface to be inspected by one surface inspection.

As illustrated in FIG. 6(A), the flat particle (FP) to be detected in the present embodiment is a disk-shaped particle having a diameter of 200 nm and a thickness of 5 nm. As illustrated in FIG. 6(B), the pit to be detected in the present embodiment is a circular pit having a diameter of 200 nm and a depth of 5 nm. However, the size, shape, or the like of the scatterers illustrated in FIG. 6 are merely examples, and the scatterers are not limited thereto.

In the following description, it is assumed that the flat particle and the pit illustrated in FIG. 6 are selected as the types of scatterers to be detected. In the following description, the flat particle may be referred to as a "first type", and the pit may be referred to as a "second type".

A description will be made referring back to FIG. 5. In step S21, the intensity calculation part 21 included in the inspection condition presentation apparatus 2 receives information indicating the type of scatterer to be detected, from the user terminal 3. Next, the intensity calculation part 21 calculates intensity distributions of the scattered light when the inspection light is irradiated on the surface of the inspection target on which the types of scatterers to be detected are present, according to a plurality of predetermined incidence condition candidates. Then, the intensity calculation part 21 transmits the calculated intensity distributions of the scattered light to the incidence condition presentation part 22.

The calculation of the intensity distribution may be performed using an optical simulation, or may be performed based on a result of actual measurements, using a sample of the inspection target on which the scatterer is present. An example of a method for calculating the intensity distribution using the optical simulation is a method for analyzing electromagnetic field distribution using a finite-difference time-domain (FDTD) method. More particularly, a model is set depending on the type of scatterer, a near field (near-field) is actually obtained, and the near field is integrated to calculate a far field (far-field) representing an intensity distribution of the detected light. The far field is used because a global distribution of the scattered light can be comprehensively evaluated. The influence of the substrate can be eliminated by calculating and subtracting the electromagnetic field distribution of the substrate not having the concavo-convex structure.

The intensity calculation part 21 performs the calculation of the intensity distribution described above for each combination of the type of scatterer to be detected and predetermined incidence condition candidates. The incidence condition candidates are determined by combining values that can be taken by the incident angle, the wavelength, and the polarization, so as not to overlap one another. For example, in a case where the values that can be taken by the incident angle are {0°, 15°, 30°, 45°, 60°}, and the values that can be taken by the polarized light are {P-polarized light, S-polarized light}, the values are combined to obtain all combinations such as (0°, P-polarized light), (0°, S-polarized light), (15°, P-polarized light), (15°, S-polarized light), . . . .

The size of the scatterer is less than or equal to the wavelength $\lambda$ of the inspection light, and is desirably larger than one-tenth of the wavelength λ. For this reason, the wavelength λ of the inspection light may be arbitrarily determined depending on a size D of the scatterer. For example, in order to detect the scatterer illustrated in FIG. 6, the wave length λ of the inspection light may be set to 405 nm or the like.

Figure 7:
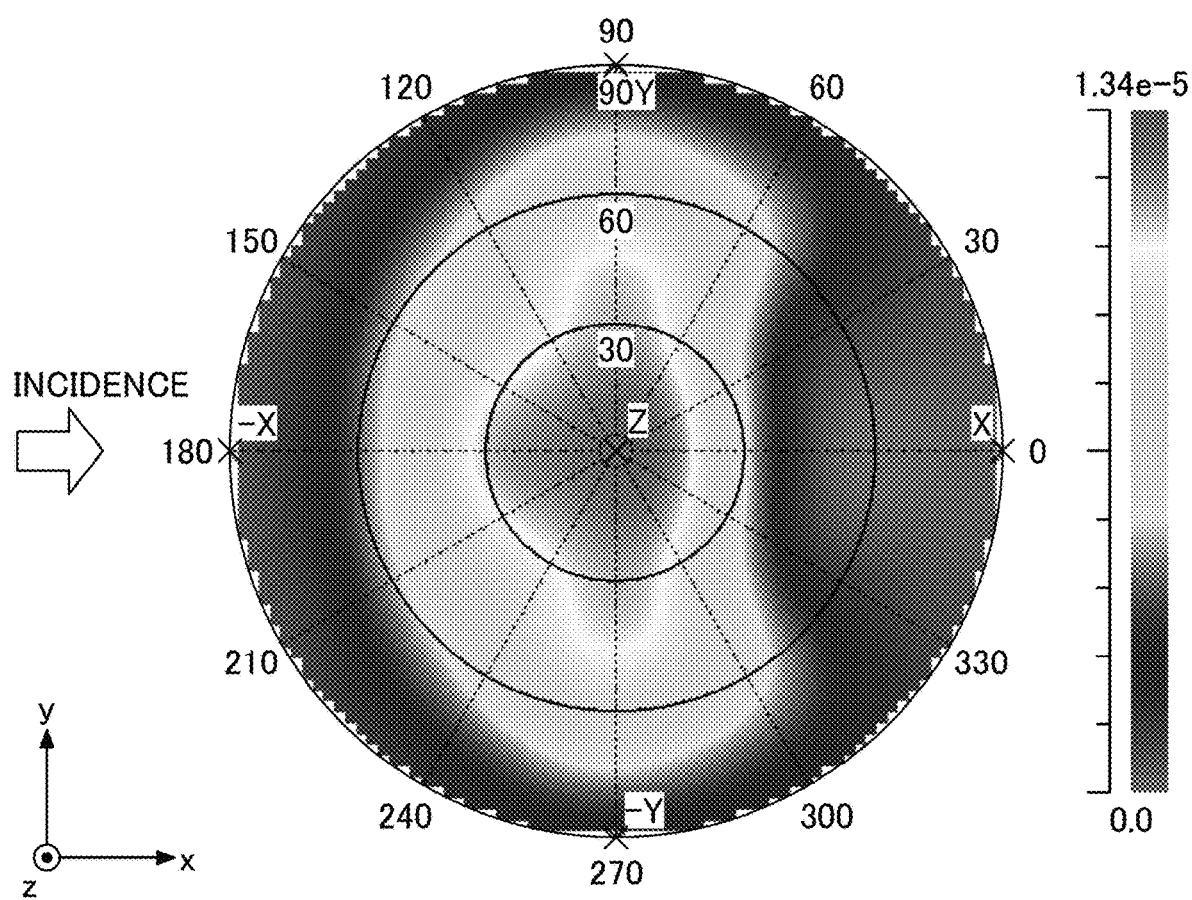
FIG. 7 is a diagram illustrating an example of an intensity distribution of scattered light.

FIG. 7 is a diagram illustrating an example of an intensity distribution of the scattered light. The intensity distribution illustrated in FIG. 7 is a diagram in which an upper hemisphere of the far field is represented by a plane. FIG. 7 is represented by an orthogonal coordinate system in which a left-right direction is an x-axis (the right side is +x, and the left side is −x), an up-down direction is a y-axis (the upper side is +y, and the lower side is −y), and a center is a z-axis (the front side is +z, and the rear side is −z). The inspection light is incident from the −x side (180°). For this reason, a scattering to the x side (0°) is a forward scattering.

In the present embodiment, because the inspection target is assumed to be the semiconductor wafer or the flat metal, the scattering to the upper hemisphere of the far field is dominant. Hence, in the following processes, it is also assumed that only the upper hemisphere of the far field is used for the intensity distribution of the scattered light. However, depending on the properties of the inspection target, there are cases where it is better to use the entire sphere of the far field, and there are cases where it is better to use only the lower hemisphere of the far field.

A description will be made referring back to FIG. 5. In step S22, the incidence condition presentation part 22 included in the inspection condition presentation apparatus 2 receives the intensity distributions of the scattered light from the intensity calculation part 21. Next, the incidence condition presentation part 22 selects an intensity distribution in which the intensity of the scattered light becomes a maximum, from among the received intensity distributions of the scattered light. Then, the incidence condition presentation part 22 transmits the incidence condition candidate used to obtain the selected intensity distribution to the user terminal 3.

Figure 8:
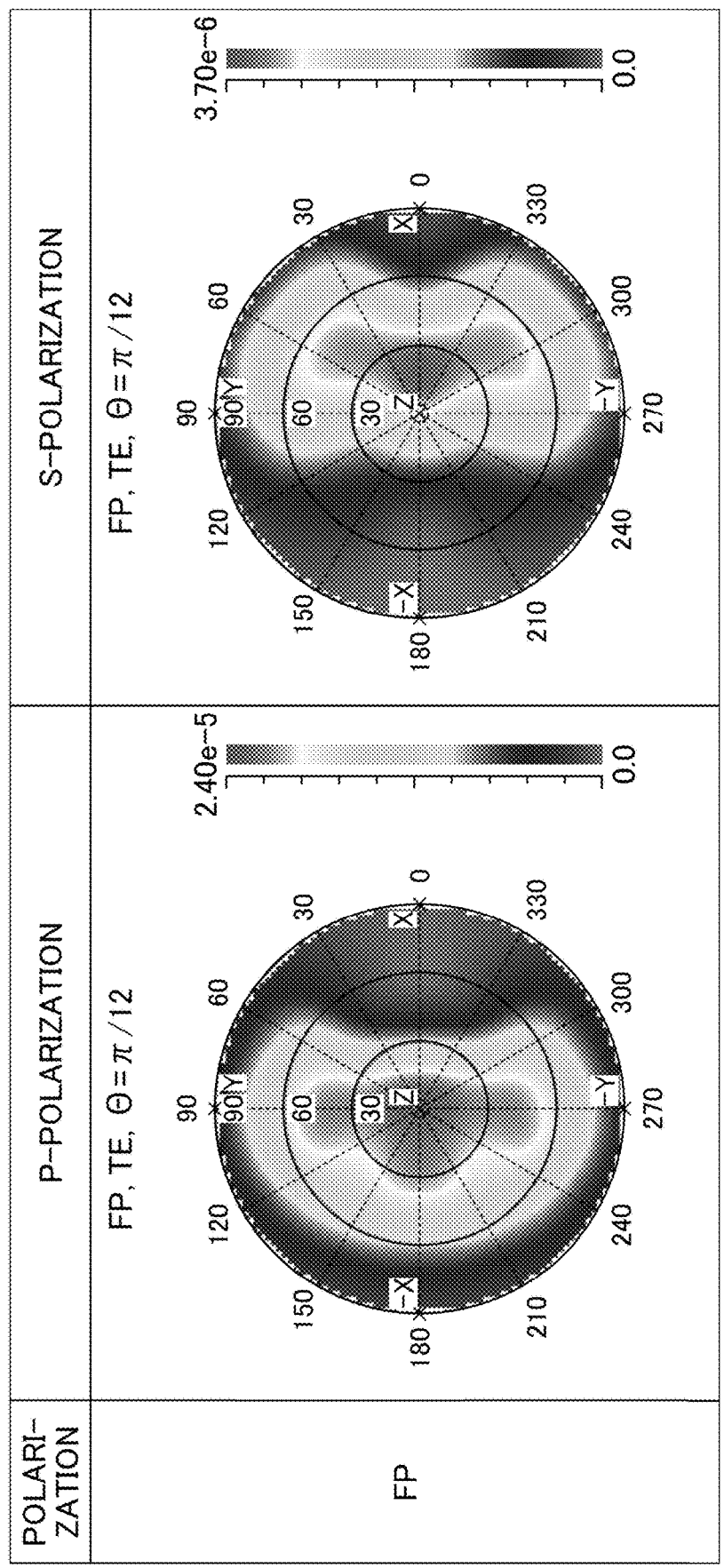
FIG. 8 is a diagram for explaining a difference in intensity distributions of scattered light due to polarization.

Next, the difference in the intensity distributions of the scattered light due to the polarization of the inspection light will be described. FIG. 8 is a diagram for explaining a difference in intensity distributions of the scattered light due to the polarization, and is a diagram illustrating the intensity distributions of the scattered light when the inspection light irradiates the inspection target on which the flat particle (FP) is present, using the P-polarized light and the S-polarized light. The incident angle is set to 15° in each of these cases.

As illustrated in FIG. 8, in the case of the P-polarized light, it can be seen that the scattering mainly occurs from the upper side toward the rear side. Further, in the case of the S-polarized light, it can be seen that the scattering occurs from the upper side toward the front side. It may be regarded that this is because the P-polarized light induces an electric field in the height and depth directions, while the S-polarized light does not directly induce an electric field. Further, in the case of the S-polarized light, it can be seen that the intensity of the scattered light is small as a whole. Accordingly, in the case where the scatterer is the flat particle, there is no response to the S-polarized light, and it can be seen that the polarization of the inspection light should be set to the P-polarized light.

Figure 9:
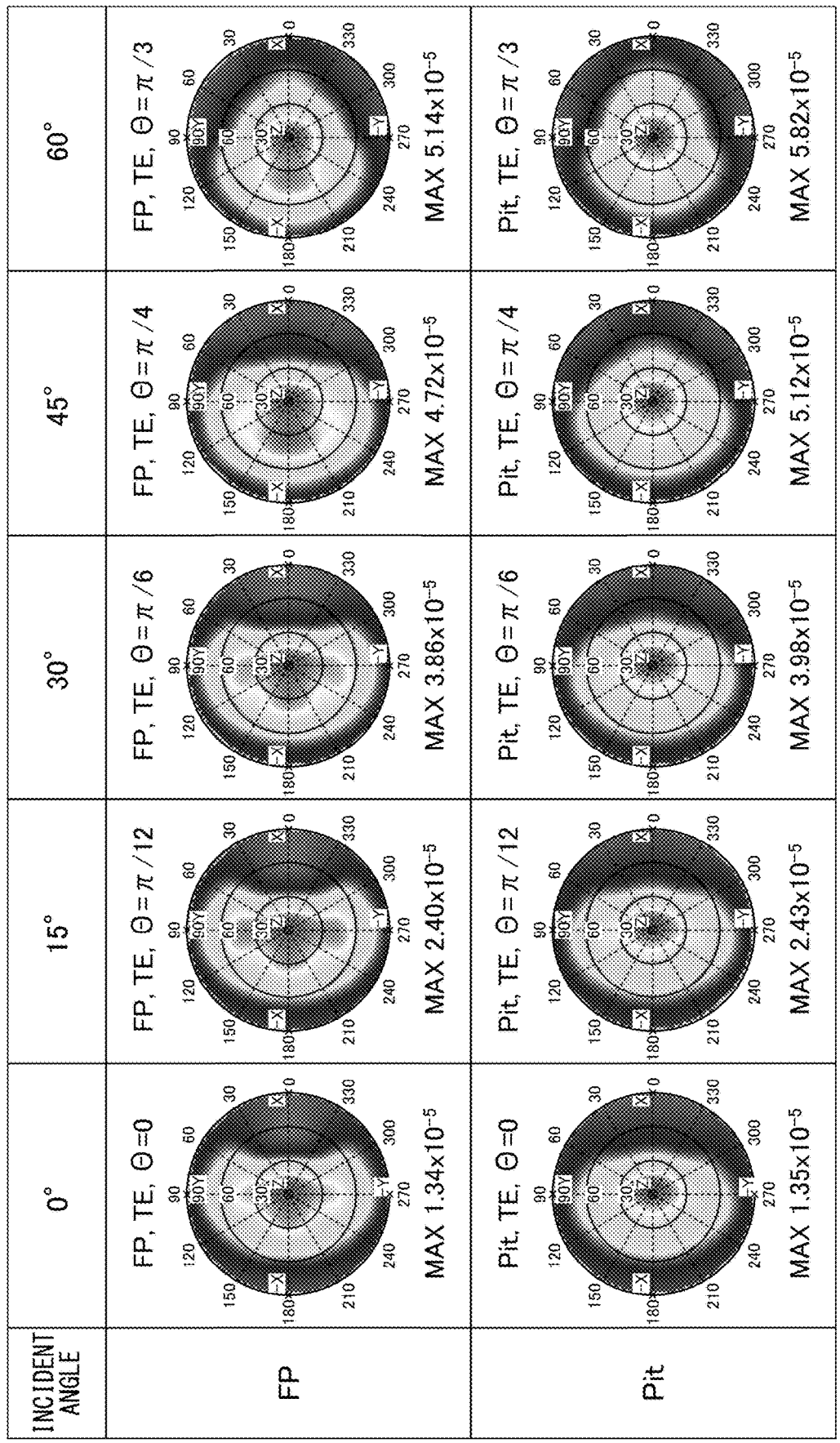
FIG. 9 is a diagram for explaining a difference in the intensity distributions of the scattered light due to an incident angle.

Next, the difference in the intensity distributions of the scattered light depending on the incident angle of the inspection light will be described. FIG. 9 is a diagram for explaining the difference in the intensity distributions of the scattered light depending on the incident angle, and is a diagram illustrating the intensity distributions of the scattered light when the inspection light is irradiated at incident angles of 0° (that is, parallel to the surface of the inspection target), 15°, 30°, 45°, and 60° to the inspection target having the flat particle (FP) or pit. The polarized light is set to the P-polarized light in each of the cases.

As illustrated in FIG. 9, it can be seen that the intensity of the upward scattering increases as the incident angle increases. It can also be seen that the intensity of the forward scattering increases as the incident angle increases. That is, as the incident angle increases, the scattered light becomes isotropic. Accordingly, in the case where the scatterer is the flat particle (FP) or pit, it can be seen that the incident angle should be set small. In the example of FIG. 9, it can be seen that the anisotropy of the scattered light becomes conspicuous at the incident angle of 15° than at the incident angle of 30°.

Figure 10:
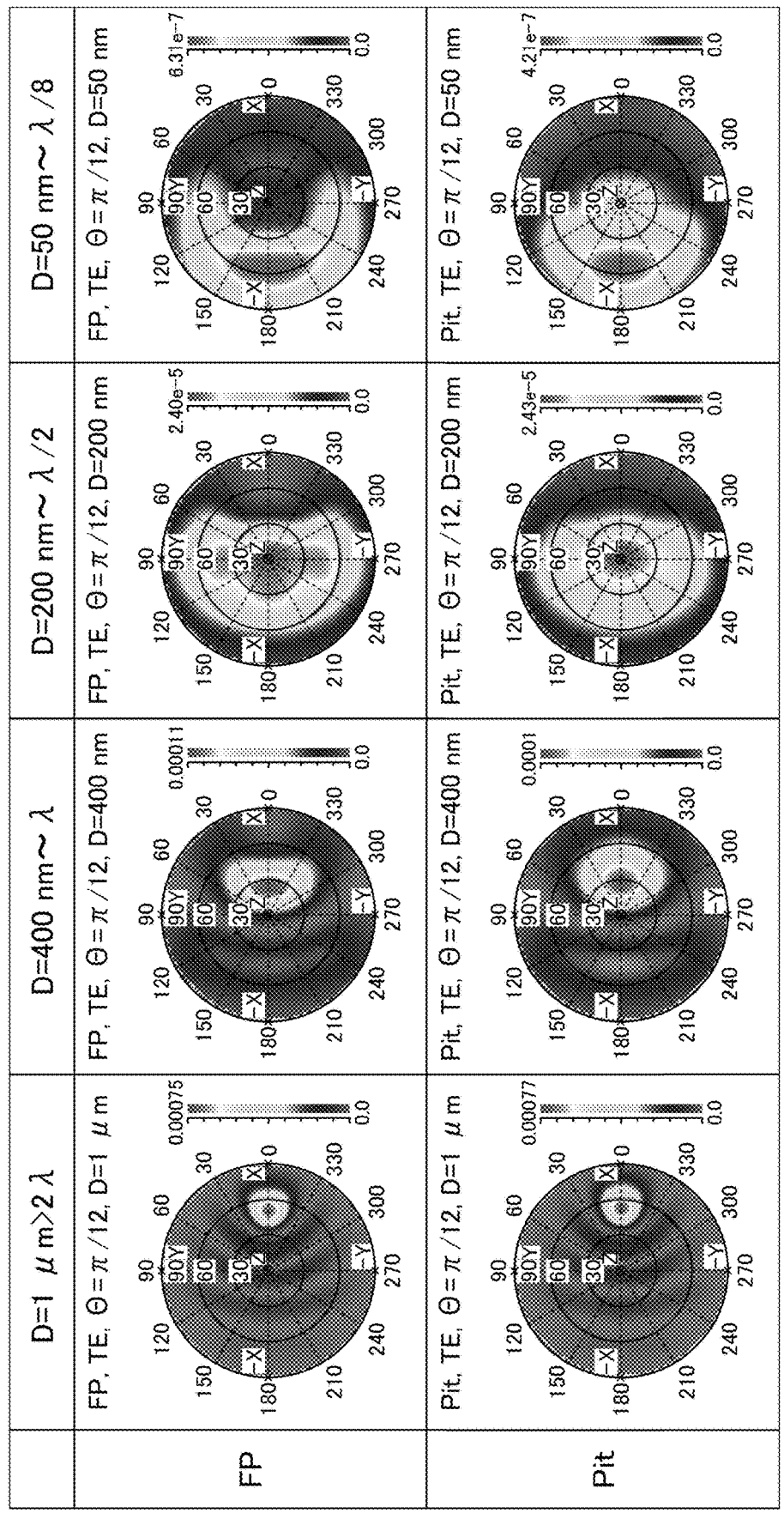
FIG. 10 is a diagram for explaining a relationship between a size of the scatterer and the intensity distribution of the scattered light due to wavelength.

Next, the difference in the intensity distributions of the scattered light depending on the wavelength of the inspection light will be described. FIG. 10 is a diagram for explaining a relationship between the size of scatterer and the intensity distribution of scattered light due to the wavelength, and is a diagram illustrating the intensity distributions of the scattered light when the inspection light having the wavelength of 405 nm is irradiated on inspection targets having flat particles (FP) or pits with diameters of 1 micrometer (μm), 400 nm, 200 nm, and 50 nm, respectively. In FIG. 10, λ denotes the wavelength of the inspection light, and D denotes the size of the scatterer. The incident angle and the polarized light are set to 15° and P-polarized light, respectively.

As illustrated in FIG. 10, in a case where the size D of the scatterer is larger than the wave length λ of the inspection light (D=1 μm) and in a case where the size D of the scatterer is approximately equal to the wavelength λ of the inspection light (D=400 nm), there is substantially no difference in the intensity distributions between the case where the scatterer is the flat particle (FP) and the case where the scatterer is the pit. On the other hand, in a case where the size D of the scatterer is smaller than the wavelength λ of the inspection light (D=200 nm, 50 nm), there is a notable difference in the intensity distributions between the case where the scatterer is the flat particle (FP) and the case where the scatterer is the pit. Accordingly, in the case where the scatterer is the flat particle (FP) or the pit, it can be seen that the wavelength λ should be set smaller than the size D of the scatterer.

A description will be made referring back to FIG. 5. In step S32, the incidence condition display part 32 included in the user terminal 3 receives the incidence condition candidate from the inspection condition presentation apparatus 2. Then, the incidence condition display part 32 displays the received incidence condition candidate on the display device 506 or the like.

In step S33, the incidence condition input part 33 included in the user terminal 3 receives the input of the incidence condition instructed by the user in response to the incidence condition display part 32 displaying the incidence condition candidate. In addition, the incidence condition input part 33 transmits the received incidence condition to the inspection condition presentation apparatus 2.

In step S23, the incidence condition reception part 23 included in the inspection condition presentation apparatus 2 receives the incidence condition from the user terminal 3. In addition, the incidence condition reception part 23 transmits the received incidence condition to the first distribution calculation part 24 and the second distribution calculation part 25.

In step S24, the first distribution calculation part 24 included in the inspection condition presentation apparatus 2 receives the incidence condition from the incidence condition reception part 23. Next, the first distribution calculation part 24 calculates the intensity distribution (that is, the first distribution) of the scattered light when the inspection light is irradiated on the surface of the inspection target on which the first type scatterer is present, based on the received incidence condition. Then, the first distribution calculation part 24 transmits the calculated first distribution to the difference calculation part 26.

In step S25, the second distribution calculation part 25 included in the inspection condition presentation apparatus 2 receives the incidence condition from the incidence condition reception part 23. Next, the second distribution calculation part 25 calculates the intensity distribution (that is, the second distribution) of the scattered light when the inspection light is irradiated on the surface of the inspection target on which the second type scatterer is present, based on the received incidence condition. Then, the second distribution calculation part 25 transmits the calculated second distribution to the difference calculation part 26.

In step S26, the difference calculation part 26 included in the inspection condition presentation apparatus 2 receives the first distribution from the first distribution calculation part 24. In addition, the difference calculation part 26 receives the second distribution from the second distribution calculation part 25. Next, the difference calculation part 26 calculates a difference between the first distribution and the second distribution. Then, the difference calculation part 26 transmits the calculated difference between the first distribution and the second distribution to the coordinate acquisition part 27.

Figure 11:
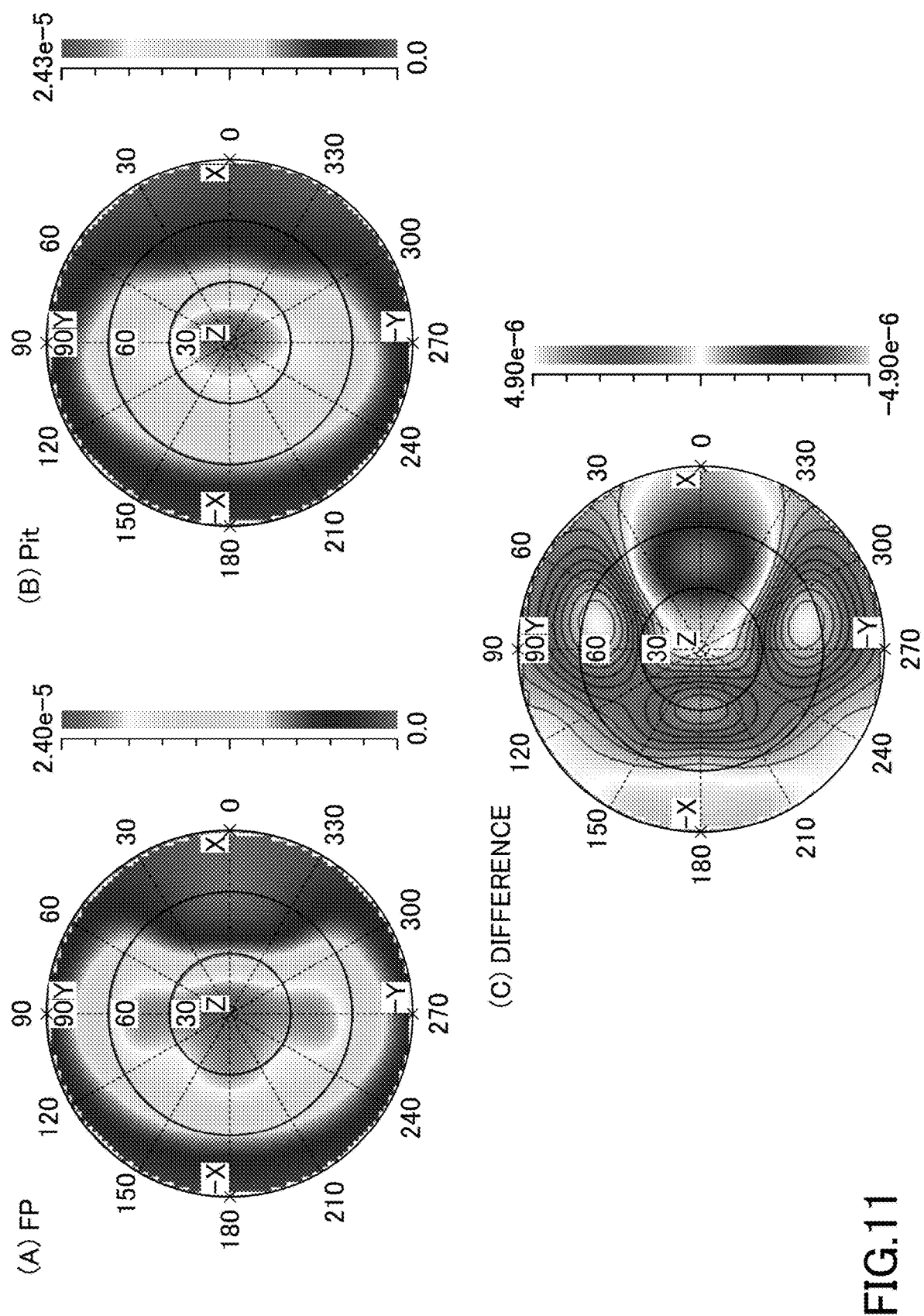
FIG. 11(A) is a diagram illustrating an example of a first distribution.
FIG. 11(B) is a diagram illustrating an example of a second distribution.
FIG. 11(C) is a diagram illustrating an example of a difference between the first distribution and the second distribution.

The difference between the distributions is a result of calculating a difference between intensities located at identical coordinates in each of the distributions. FIG. 11 is a diagram illustrating an example of the difference in the distributions. FIG. 11(A) illustrates an intensity distribution (that is, the first distribution) of the scattered light generated due to the flat particle (FP). FIG. 11(B) illustrates an intensity distribution (that is, the second distribution) of the scattered light generated due to the pit. FIG. 11(C) illustrates a difference between FIG. 11(A) and FIG. 11(B).

A description will be made referring back to FIG. 5. In step S27, the coordinate acquisition part 27 included in the inspection condition presentation apparatus 2 receives the difference between the first distribution and the second distribution, from the difference calculation part 26. Next, the coordinate acquisition part 27 acquires coordinates (that is, extreme value coordinates) indicating a local maximum value or a local minimum value in the received difference between the first distribution and the second distribution. Then, the coordinate acquisition part 27 transmits the acquired extreme value coordinates to the detection condition presentation part 28.

Figure 12:
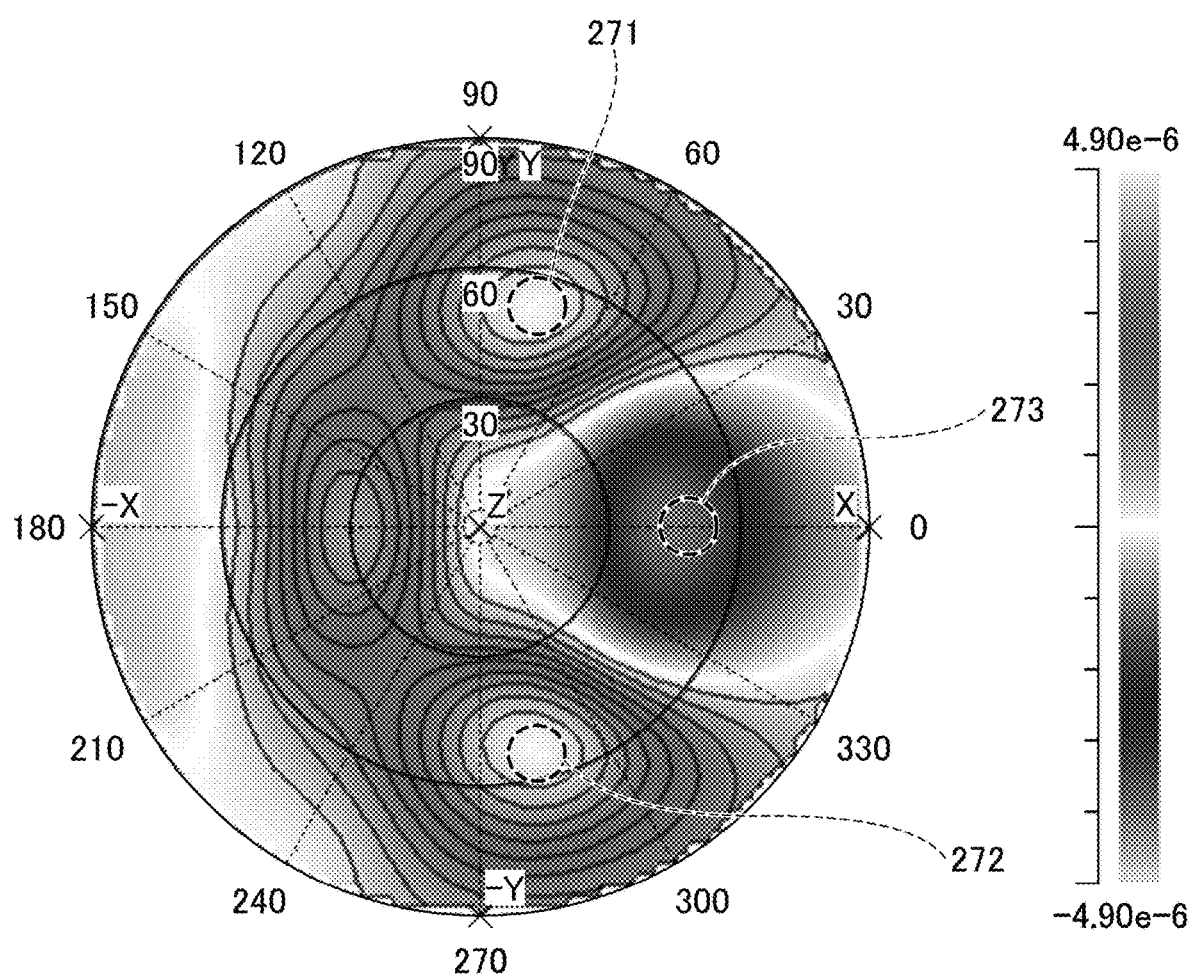
FIG. 12 is a diagram illustrating an example of extreme value coordinates of the difference.

FIG. 12 is a diagram illustrating an example of extreme value coordinates of the difference. As illustrated in FIG. 12, coordinates 271 and 272 indicating the local maximum value and coordinates 273 indicating the local minimum value of the difference between the first distribution and the second distribution, are acquired as the extreme value coordinates. The coordinates indicating the extreme value of the difference represent a position where the difference between the intensities of the scattered light due to the first type scatterer and the second type scatterer is large, and can be regarded as a position where the anisotropy of the scattered light becomes conspicuous. Accordingly, it can be expected that the type of scatterer can be determined with a high accuracy, by detecting the scattered light at this position.

A description will be made referring back to FIG. 5. In step S28, the detection condition presentation part 28 included in the inspection condition presentation apparatus 2 receives the extreme value coordinates from the coordinate acquisition part 27. Next, the detection condition presentation part 28 generates the detection condition candidate, based on the arrangement of the received extreme value coordinates. Then, the detection condition presentation part 28 transmits the generated detection condition candidate to the user terminal 3.

The detection condition candidate includes a scatterer presence or absence detection position candidate that is a detection position for determining whether or not a scatterer is present, and a scatterer type detection position candidate that is a detection position for determining a type of scatterer that is present. The detection condition presentation part 28 includes, in the detection condition candidate, coordinates where the intensity of the scattered light is high and common to the first distribution and the second distribution, as the scatterer presence or absence detection position candidate. In addition, the detection condition presentation part 28 includes, in the detection condition candidate, coordinates where the type of scatterer can be determined using the smallest number of detection positions, as the scatterer type detection position candidate.

Figure 13:
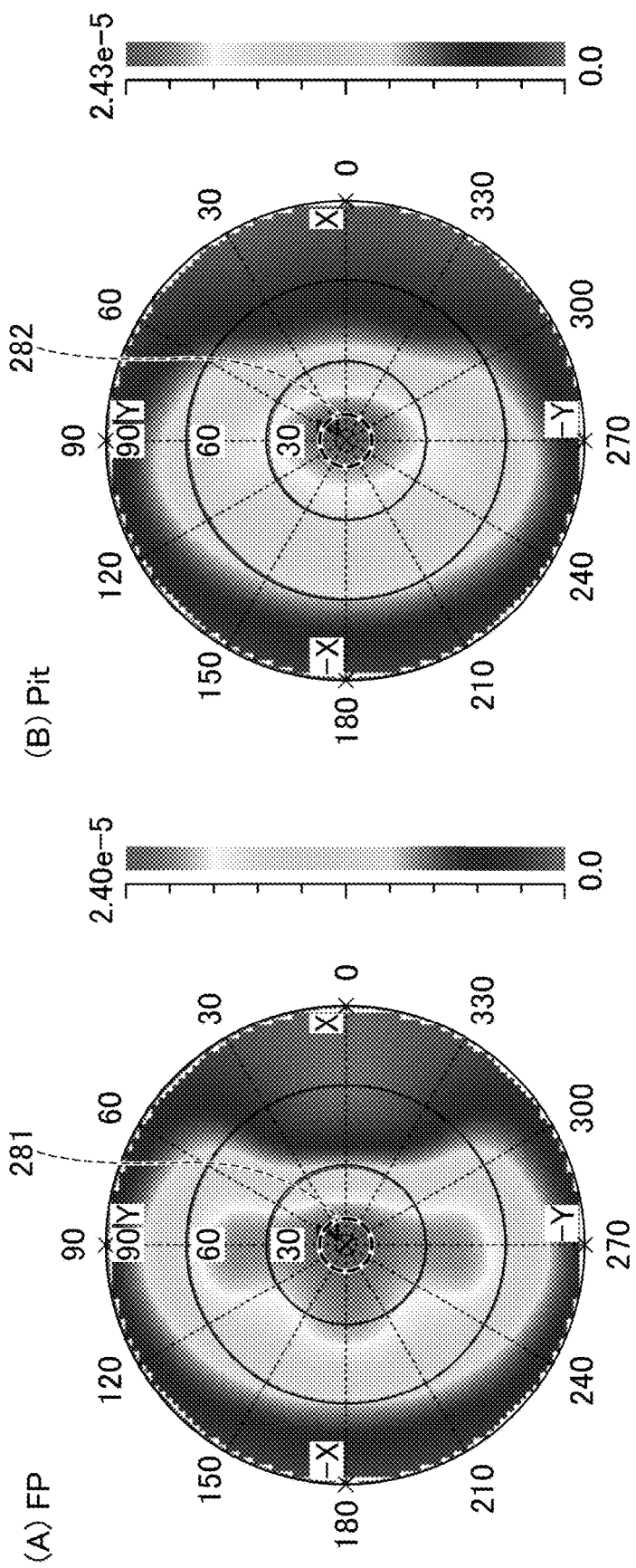
FIG. 13(A) is a diagram illustrating an example of a scatterer presence or absence detection position in the first distribution.
FIG. 13(B) is a diagram illustrating an example of scatterer presence or absence detection position in the second distribution.

FIG. 13 is a diagram illustrating examples of the scatterer presence or absence detection position. FIG. 13(A) is a diagram illustrating an example of the scatterer presence or absence detection position in the intensity distribution (first distribution) of the scattered light generated due to the flat particle (FP). FIG. 13(B) is a diagram illustrating an example of the scatterer presence or absence detection position in the intensity distribution (second distribution) of the scattered light generated due to the pit.

As illustrated in FIG. 13, in this example, in both the first distribution and the second distribution, coordinates 281 and 282 corresponding to centers of the distributions are coordinates having a highest intensity. Accordingly, it can be expected that the presence or absence of the scatterer can be determined with a high accuracy, by setting the center of the inspection target as the scatterer presence or absence detection position. For this reason, in this example, the coordinates corresponding to the center of the inspection target are presented as the scatterer presence or absence detection position candidate.

Figure 14:
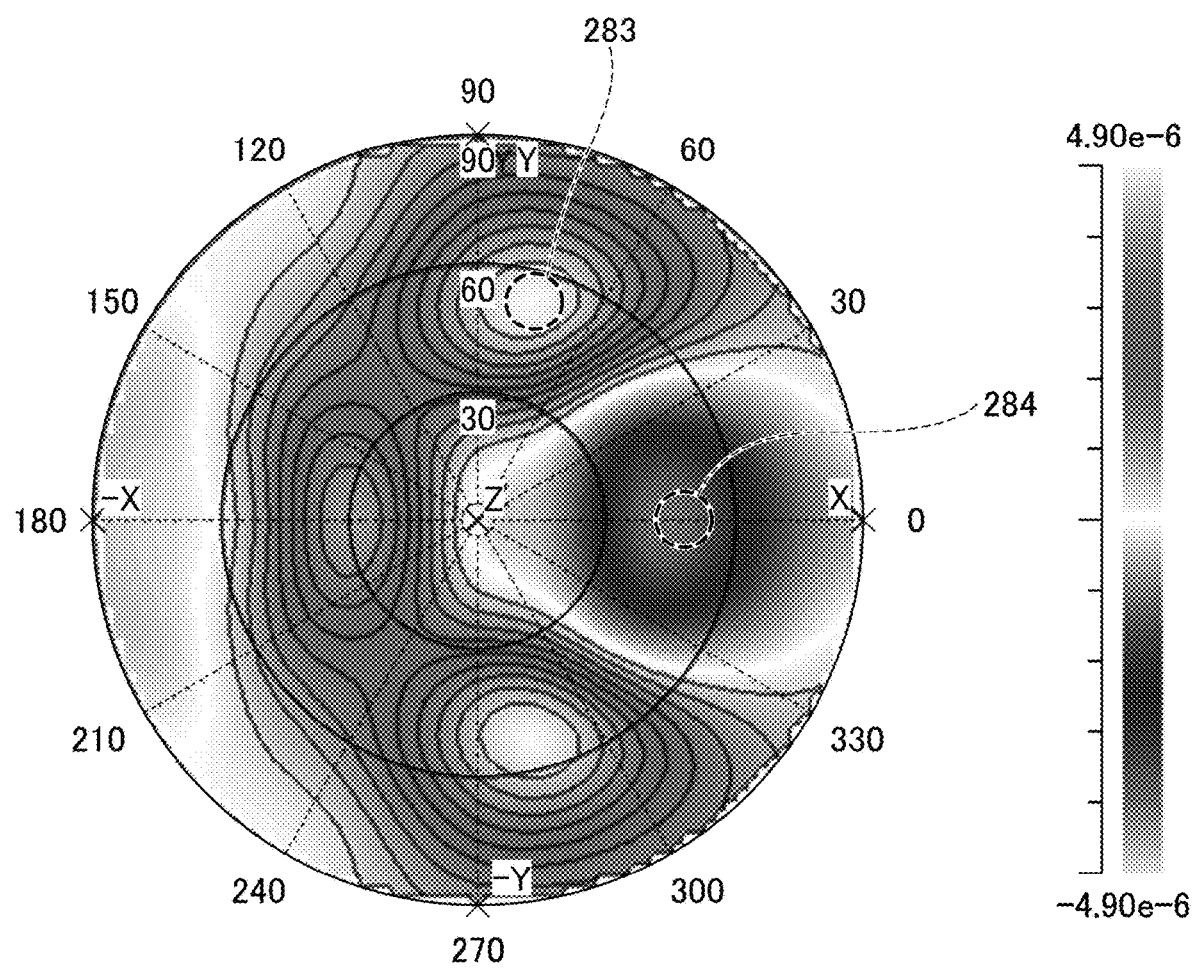
FIG. 14 is a diagram illustrating an example of a scatterer type detection position.

FIG. 14 is a diagram illustrating an example of the scatterer type detection position. As illustrated in FIG. 14, in this example, coordinates 283 on the +y side of the center of the distribution, and coordinates 284 on the +x side of the center of the distribution, are presented as the scatterer type detection position candidates. The coordinates 283 correspond to the extreme value coordinates 271 illustrated in FIG. 12, and the coordinates 284 correspond to the extreme value coordinates 273 illustrated in FIG. 12.

It can be expected that the type of scattered light can be determined with a high accuracy, by detecting the scattered light at all the extreme value coordinates. However, in this case, it becomes necessary to use a large number of light receiving devices. Because the extreme value coordinates 271 and the extreme value coordinates 272 are located symmetrically with respect to the x-axis (that is, the plane of incidence), it can be expected that the type of scattered light can be determined with a sufficiently high accuracy, by detecting the scattered light at one of these symmetrically located coordinates. Further, in this case, the number of light receiving devices can be reduced compared to the case where the scattered light is detected at all of the extreme value coordinates. For this reason, in this example, among the extreme value coordinates 271 through 273 illustrated in FIG. 12, the extreme value coordinates 271 and the extreme value coordinates 273 are presented as the scatterer type detection position candidates.

A description will be made referring back to FIG. 5. In step S34, the detection condition display part 34 included in the user terminal 3 receives the detection condition candidate from the inspection condition presentation apparatus 2. Then, the detection condition display part 34 displays the received detection condition candidate on the display device 506 or the like.

The analysis results illustrated in FIG. 8 through FIG. 10 and FIG. 13 through FIG. 14 are examples of the analysis results for the cases where the flat particle and the pit illustrated in FIG. 6 are selected, and different results are of course obtained in cases where different scatterers are selected.

<Procedure of Surface Inspection Method>

Figure 15:
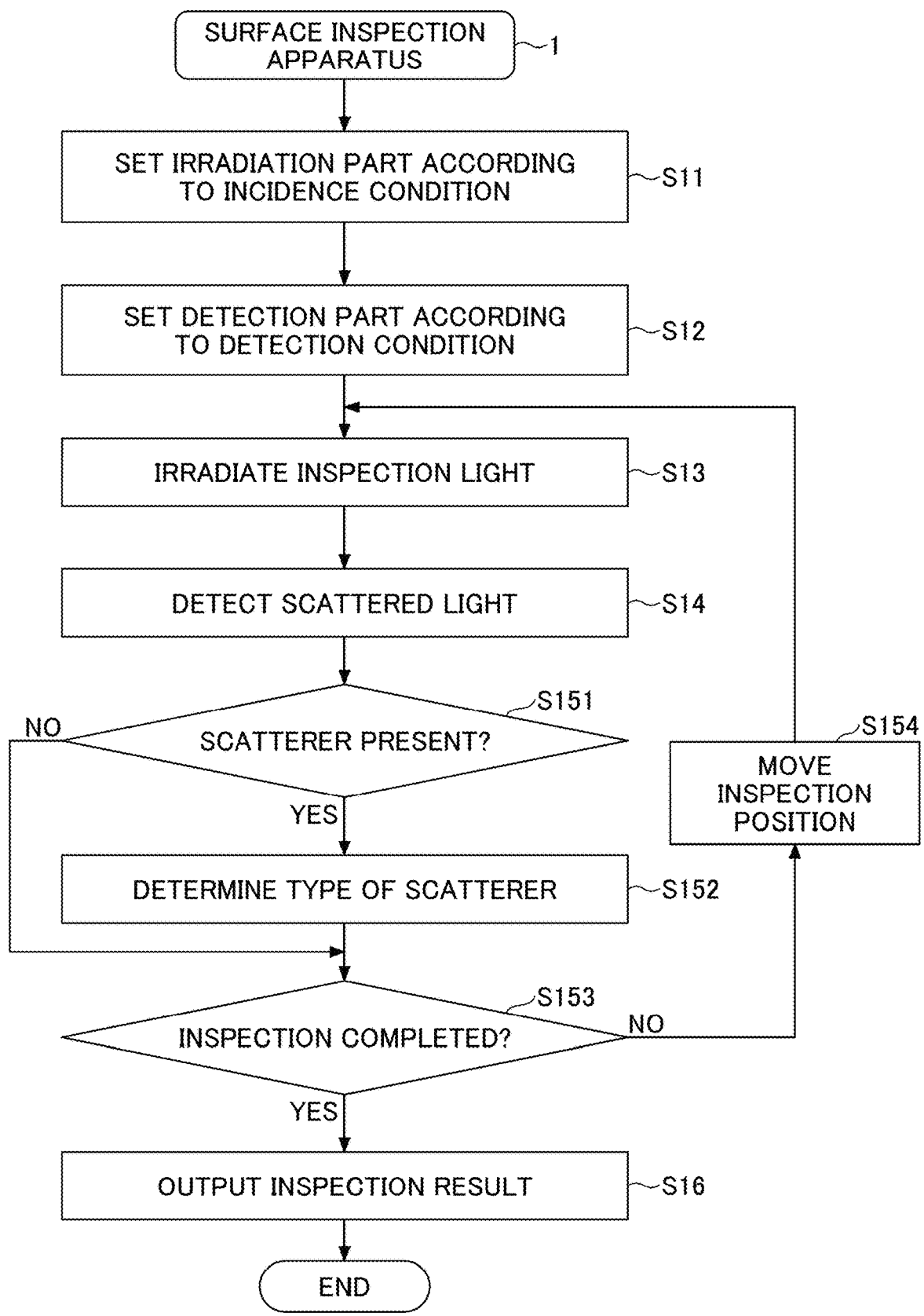
FIG. 15 is a flow chart illustrating an example of a procedure of a surface inspection method according to the first embodiment.

Next, a procedure of a surface inspection method executed by the surface inspection system according to the present embodiment will be described. FIG. 15 is a flow chart illustrating an example of the procedure of the surface inspection method according to the present embodiment.

In step S11, the incidence condition setting part 11 included in the surface inspection apparatus 1 sets the irradiation part 13, so as to irradiate the inspection light according to the incidence condition instructed by the user, in response to a user operation. More particularly, the incidence condition setting part 11 sets a position and an angle of the irradiation device 111, so that the inspection light irradiates the surface of the inspection target at the incident angle included in the instructed incidence condition. In addition, the incidence condition setting part 11 sets the irradiation device 111, so that the inspection light is irradiated with the wavelength and the polarization included in the instructed incidence condition.

In step S12, the detection condition setting part 12 included in the surface inspection apparatus 1 sets the detection part 14, so as to detect the scattered light according to the detection condition instructed by the user, in response to a user operation. More particularly, the detection condition setting part 12 sets a number and positions of the light receiving devices 112, so as to detect scattered light at the scatterer presence or absence detection position and the scatterer type detection position included in the instructed detection condition.

In step S13, the irradiation part 13 included in the surface inspection apparatus 1 controls the irradiation device 111, so as to irradiate the inspection light on the surface of the inspection target, according to the incidence condition set by the incidence condition setting part 11.

In step S14, the detection part 14 included in the surface inspection apparatus 1 detects the scattered light generated at the surface of the inspection target, according to the detection condition set by the detection condition setting part 12. More particularly, the detection part 14 detects the scattered light acquired by the light receiving device 112-1 and the light receiving device 112-2 at the scatterer presence or absence detection position and the scatterer type detection position.

In step S151, the scatterer determination part included in the surface inspection apparatus 1 determines whether or not a scatterer is present on the inspection target, based on the scattered light detected by the detection part 14 at the scatterer presence or absence detection position. In a case (YES) where it is determined that the scatterer is present, the scatterer determination part 15 advances the process to step S152. In a case (NO) where it is determined that the scatterer is absent, the scatterer determination part 15 advances the process to step S153.

In step S152, the scatterer determination part 15 included in the surface inspection apparatus 1 determines the type of scatterer present on the inspection target, based on the scattered light detected by the detection part 14 at the scatterer type detection position.

In step S153, the scatterer determination part included in the surface inspection apparatus 1 determines whether or not the inspection of the entire surface of the inspection target is completed. In a case (NO) where it is determined that the inspection is not completed (there is an uninspected portion on the surface of the inspection target), the scatterer determination part 15 advances the process to step S154. In a case (YES) where it is determined that the inspection is completed (there is no uninspected portion on the surface of the inspection target), the scatterer determination part 15 advances the process to step S16.

In step S154, the scatterer determination part included in the surface inspection apparatus 1 moves an inspection position on the surface of the inspection target. More particularly, the scatterer determination part 15 drives the drive controller 114 to move the table 113, thereby changing relative positions of the inspection target, and the irradiation device 111 and the light receiving device 112. Then, the scatterer determination part 15 executes the processes from step S13 through step S153 again, at a new inspection position.

In step S16, the result output part 16 included in the surface inspection apparatus 1 receives the inspection result indicating the presence or absence of the scatterer and the type of scatterer, from the scatterer determination part 15 for each inspection position. Then, the result output part 16 outputs the received inspection result to the display device 506 or the like.

Effects of First Embodiment

The surface inspection system according to the present embodiment calculates the intensity distribution of the scattered light when the inspection light is irradiated on the surface of a plurality of inspection targets on which scatterers of different types are present according to a plurality of incidence condition candidates, and presents an incidence condition candidate with which the scattered light intensity becomes a maximum. According to this configuration, it is possible to irradiate the inspection light on the inspection target so that the anisotropy of the scattered light becomes conspicuous depending on the type of scatterer, thereby making it possible to efficiently perform the surface inspection using a small number of irradiation devices.

In addition, the surface inspection system according to the present embodiment presents the position where the intensity of scattered light is high and common to the intensity distribution of scattered light due to the first type of scatterer and the intensity distribution of scattered light due to the second type of scatterer, as the detection position for determining whether or not the scatterer is present. Hence, it is possible to efficiently determine the presence or absence of the scatterer using a single light receiving device.

Moreover, the surface inspection system according to the present embodiment presents, the detection positions where the type of scatterer can be determined using the smallest number of detection positions, from the difference between the intensity distribution of the scattered light due to the first type of scatterer and the intensity distribution of the scattered light due to the second type of scatterer, as the detection positions for detecting the type of scatterer. Thus, it is possible to efficiently determine the type of scatterer using a minimum number of light receiving devices.

Furthermore, because the surface inspection system according to the present embodiment presents the inspection condition including the incidence condition, the scatterer presence or absence determination position, and the scatterer type determination position as described above, it is possible to simultaneously determine the presence or absence of the scatterer and the type of scatterer using a small number of optical devices, according to the inspection condition.

Second Embodiment

In the surface inspection system according to the first embodiment, it is assumed that the inspection condition presentation apparatus presents the inspection condition candidate to the user, and the user sets the optical system included in the surface inspection apparatus according to the inspection condition determined by referring to the inspection condition candidate. The surface inspection system according to a second embodiment is a surface inspection apparatus having both the functions of the inspection condition presentation apparatus and the functions of the surface inspection apparatus according to the first embodiment. The surface inspection apparatus according to the second embodiment sets the optical system according to the inspection condition obtained by a method similar to that of the first embodiment, and executes the surface inspection of the inspection target.

<Functional Configuration of Surface Inspection System>

Figure 16:
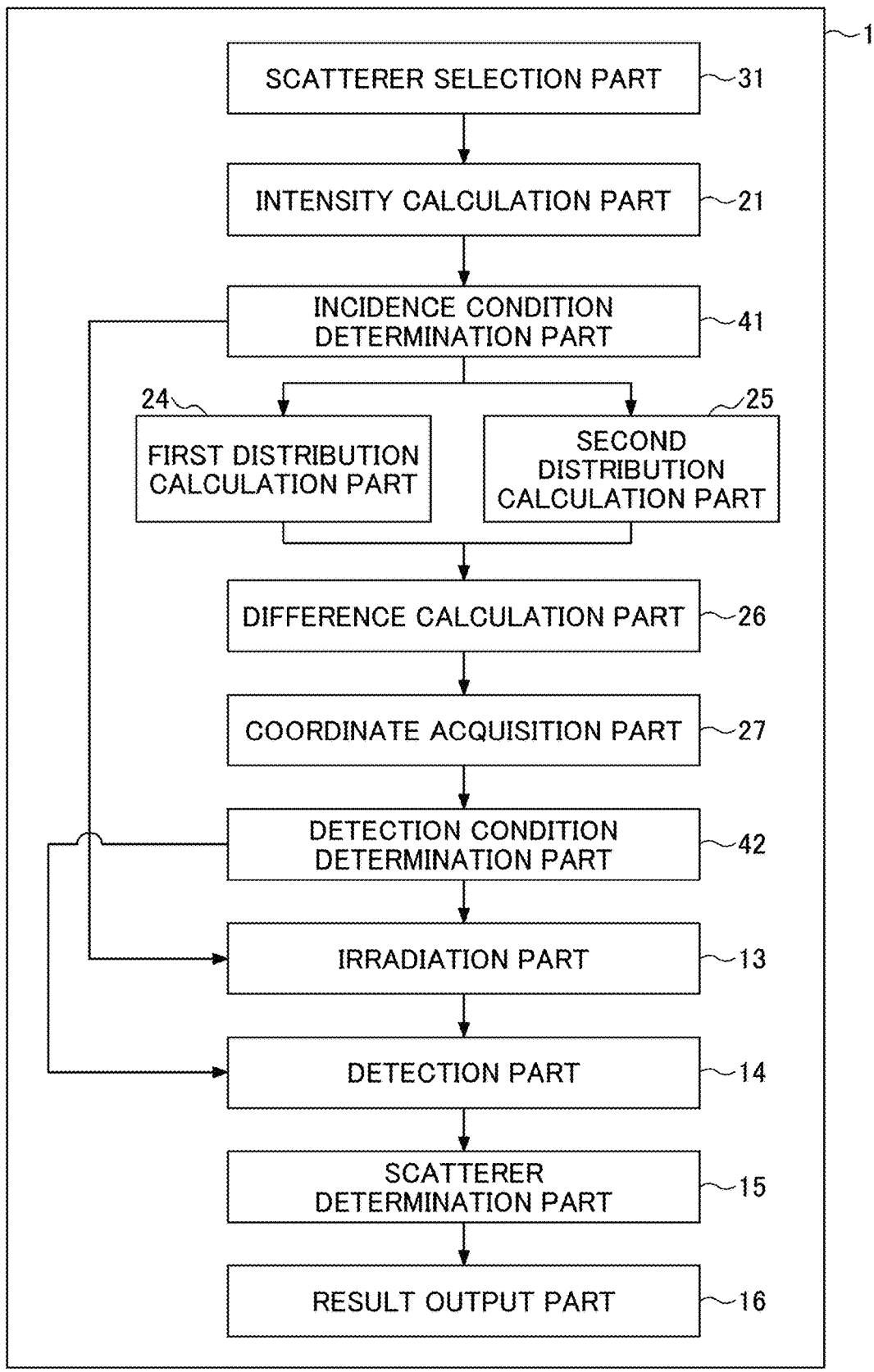
FIG. 16 is a diagram illustrating an example of a functional configuration of the surface inspection system according to a second embodiment.

First, a functional configuration of the surface inspection system according to the present embodiment will be described. FIG. 16 is a diagram illustrating an example of the functional configuration of the surface inspection system 10 according to the present embodiment.

<<Functional Configuration of Surface Inspection Apparatus 1>>

As illustrated in FIG. 16, the surface inspection apparatus 1 according to the present embodiment includes the scatterer selection part 31 included in the user terminal 3 according to the first embodiment, the intensity calculation part 21, the first distribution calculation part 24, the second distribution calculation part 25, the difference calculation part 26, and the coordinate acquisition part 27 included in the inspection condition presentation apparatus 2 according to the first embodiment, the irradiation part 13, the detection part 14, the scatterer determination part 15, and the result output part 16 included in the surface inspection apparatus 1 according to the first embodiment, and further includes an incidence condition determination part 41 and a detection condition determination part 42.

The incidence condition determination part 41 and the detection condition determination part 42 included in the surface inspection apparatus 1 according to the present embodiment may be configured by the CPU 501 in a case where the programs in the ROM 502 extracted to the RAM 503 illustrated in FIG. 3, when executed by the CPU 501, cause the CPU 501 to perform processes to control the irradiation device 111, the light receiving device 112, or the drive controller 114.

The incidence condition determination part 41 sets an incidence condition corresponding to the intensity distribution in which the intensity of the scattered light becomes a maximum, among the intensity distributions of the scattered light calculated by the intensity calculation part 21, to the irradiation part 13. That is, the incidence condition candidate presented to the user in the first embodiment is determined as the incidence condition.

The detection condition determination part 42 sets the detection condition of the scattered light determined based on the arrangement of the coordinates acquired by the coordinate acquisition part 27, to the detection part 14. That is, the detection condition candidate presented to the user in the first embodiment is determined as the detection condition.

<Procedure of inspection Condition Presentation Method>

Figure 17:
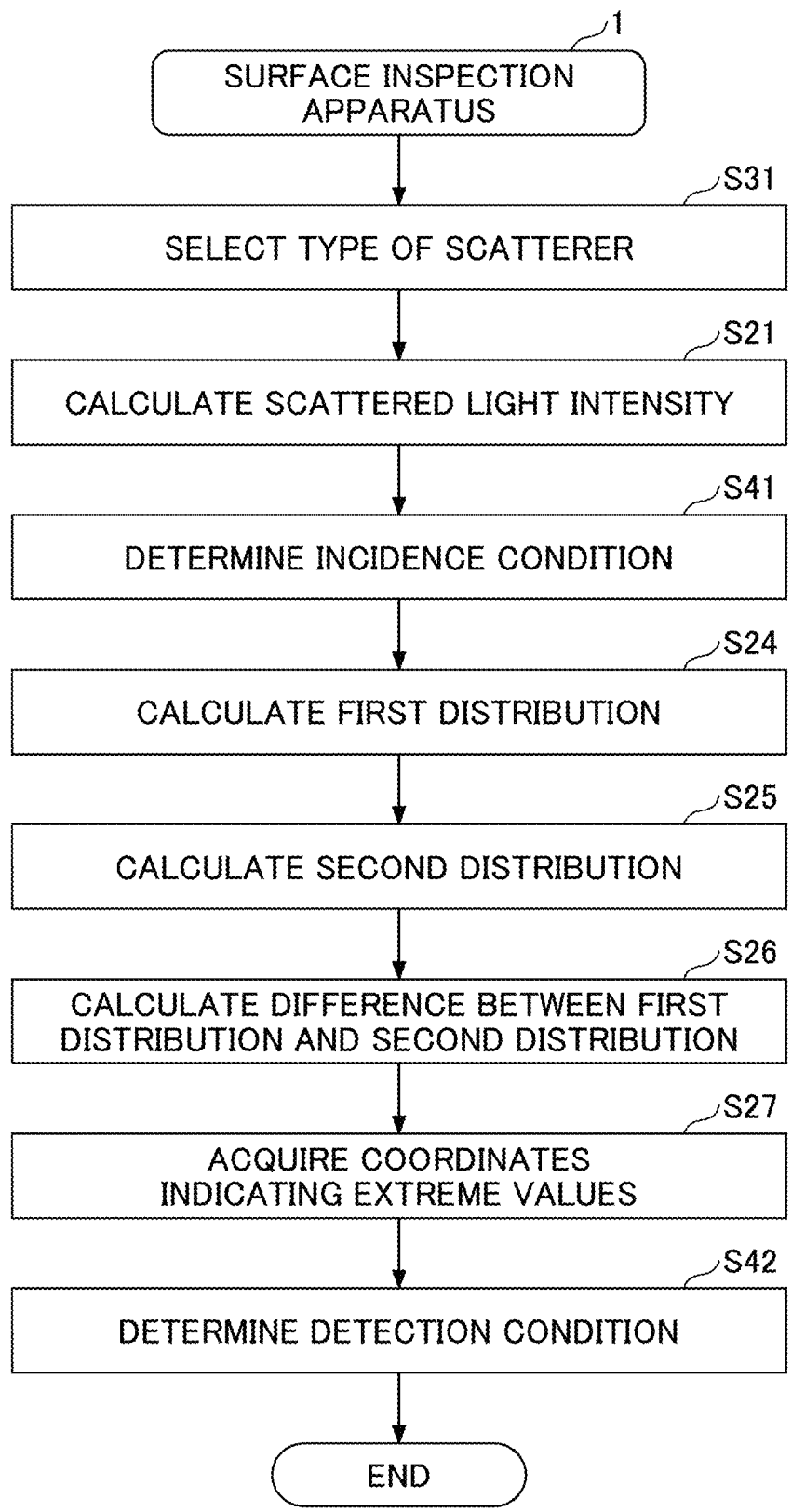
FIG. 17 is a flow chart illustrating an example of a procedure of the surface inspection method according to the second embodiment.

Next, a procedure of an inspection condition presentation method executed by the surface inspection system according to the present embodiment will be described. FIG. 17 is a flow chart illustrating an example of the procedure of the inspection condition presentation method according to the present embodiment. In the following, differences from the inspection condition presentation method according to the first embodiment will mainly be described.

In step S41, the incidence condition determination part 41 included in the surface inspection apparatus 1 receives the intensity distribution of the scattered light from the intensity calculation part 21. Next, the incidence condition determination part 41 determines an incidence condition candidate corresponding to an intensity distribution in which the intensity of the scattered light becomes a maximum among the received intensity distributions of the scattered light, as the incidence condition. The incidence condition determination part 41 sets the irradiation part 13 so as to irradiate inspection light according to the determined incidence condition. More particularly, the incidence condition determination part 41 sets the position and the angle of the irradiation device 111, so that the inspection light irradiates the surface of the inspection target at the incident angle included in the determined incidence condition. In addition, the incidence condition determination part 41 sets the irradiation device 111, so that the inspection light is irradiated with the wavelength and the polarization included in the determined incidence condition.

In step S42, the detection condition determination part 42 included in the surface inspection apparatus 1 receives the extreme value coordinates from the coordinate acquisition part 27. The detection condition determination part 42 determines a detection condition of the scattered light based on the arrangement of the received extreme value coordinates. The detection condition determination part 42 sets the detection part 14, so as to detect the scattered light according to the determined detection condition. More particularly, the detection condition determination part 42 sets the number and positions of the light receiving devices 112, so as to detect the scattered light at the scatterer presence or absence detection position and the scatterer type detection position included in the determined detection condition.

Effects of Second Embodiment

In the surface inspection system according to the present embodiment, the surface inspection apparatus also has the functions of the inspection condition presentation apparatus. In the surface inspection apparatus according to the present embodiment, the incidence condition determined by the incidence condition determination part 41 is set to the irradiation part 13, and the detection condition determined by the detection condition determination part 42 is set to the detection part 14. Hence, provided that the user determines the type of scatterer to be detected, it is possible to perform the surface inspection according to the inspection condition depending on the type of scatterer. Although a mechanism for automatically setting the optical system included in the surface inspection apparatus is required in this case, it is possible to prevent the accuracy of the inspection from deteriorating due to an error, deviation, or the like caused by a manual setting, and to efficiently perform the surface inspection.

[Supplement]

In each of the embodiments described above, step S21 executed by the intensity calculation part 21 is an example of an intensity calculation procedure. Step S22 executed by the incidence condition presentation part 22 is an example of an incidence condition presenting procedure. Step S24 executed by the first distribution calculation part 24 is an example of a first distribution calculation procedure. Step S25 executed by the second distribution calculation part 25 is an example of a second distribution calculation procedure. Step S26 executed by the difference calculation part 26 is an example of a difference calculation procedure. Step S27 executed by the coordinate acquisition part 27 is an example of a coordinate acquisition procedure. Step S13 executed by the irradiation part 13 is an example of an irradiation procedure. Step S14 executed by the detection part 14 is an example of a detection procedure. Steps S151 through S153 executed by the scatterer determination part 15 are an example of a scatterer determination procedure. Step S41 executed by the incidence condition determination part 41 is an example of an incidence condition determination procedure. Step S42 executed by the detection condition determination part 42 is an example of a detection condition determination procedure.

Although the embodiments of the present invention are described above in detail, the present invention is not limited to these embodiments, and various variations and modifications can be made within the scope of the subject matter of the present invention described in the claims.

This application is based upon and claims priority to Japanese Patent Application No. 2021-185472, filed on Nov. 15, 2021, the entire contents of which are incorporated herein by reference.

DESCRIPTION OF THE REFERENCE NUMERALS

1 Surface inspection apparatus
2 Inspection condition presentation apparatus
3 User terminal
9 Communication network
10 Surface inspection system
11 Incidence condition setting part
12 Detection condition setting part
13 Irradiation part
14 Detection part
15 Scatterer determination part
16 Result output part
21 Intensity calculation part
22 Incidence condition presentation part
23 Incidence condition reception part
24 First distribution calculation part
25 Second distribution calculation part
26 Difference calculation part
27 Coordinate acquisition part
28 Detection condition presentation part
31 Scatterer selection part
32 Incidence condition display part
33 Incidence condition input part
34 Detection condition display part
41 Incidence condition determination part
42 Detection condition determination part

The invention claimed is:

1. An inspection condition presentation apparatus comprising:
a first storage device configured to store a first program; and
a first processor configured to execute the first program and perform a process including
calculating an intensity distribution of scattered light when inspection light is irradiated on a surface of an inspection target on which scatterers of different types are present according to a plurality of incidence condition candidates;
presenting, to a user, an incidence condition candidate with which an intensity of the scattered light becomes a maximum, among the plurality of incidence condition candidates;
receiving an incidence condition instructed by the user in response to the incidence condition candidate presented to the user among the plurality of incidence condition candidates;
calculating a first distribution that is an intensity distribution of the scattered light when the inspection light is irradiated on the surface on which a first type of scatterer is present according to the incidence condition;
calculating a second distribution that is an intensity distribution of the scattered light when the inspection light is irradiated on the surface on which a second type of scatterer is present according to the incidence condition;
calculating a difference between the first distribution and the second distribution;
acquiring coordinates indicating an extreme value of the difference; and
presenting a detection condition candidate of the scattered light to the user based on an arrangement of the coordinates,
wherein the plurality of incidence condition candidates includes a wavelength of the inspection light.

2. The inspection condition presentation apparatus as claimed in claim 1, wherein the plurality of incidence condition candidates further includes at least one of an incident angle of the inspection light with respect to the surface, and a type of polarization of the inspection light.

3. The inspection condition presentation apparatus as claimed in claim 1, wherein
the detection condition candidate includes a scatterer presence or absence detection position candidate that is a detection position for determining presence or absence of the scatterer, and
the presenting the detection condition candidate presents, as the scatterer presence or absence detection position candidate, coordinates at which the intensity of the scattered light is high and in common to the first distribution and the second distribution.

4. The inspection condition presentation apparatus as claimed in claim 3, wherein
the detection condition candidate includes a scatterer type detection position candidate that is a detection position for determining the type of the scatterer, and the presenting the detection condition candidates presents, as the scatterer type detection position candidate, coordinates at which the type of the scatterer can be determined using a minimum number of detection positions.

5. The inspection condition presentation apparatus as claimed in claim 4, wherein
the inspection target is a semiconductor wafer or a flat metal, and
the type of the scatterer includes a particle adhered to the surface, and a fine protrusion, a scratch, and a pit generated at the surface.

6. A surface inspection apparatus comprising:
a second storage device configured to store a second program; and
a second processor configured to execute the second program and perform a process including
determining the incidence condition candidate presented by the inspection condition presentation apparatus according to claim 4 as an incidence condition;
determining the scatterer presence or absence detection position candidate and the scatterer type detection position candidate presented by the inspection condition presentation apparatus according to claim 4 as a scatterer presence or absence detection position and a scatterer type detection position;
irradiating the inspection light on the surface of the inspection target according to the incidence condition;
detecting the scattered light when the inspection light irradiates the surface at the scatterer presence or absence detection position and the scatterer type detection position; and
determining a presence or absence of the scatterer based on the scattered light detected at the scatterer presence or absence detection position by the detecting, and determining the type of the scatterer based on the scattered light detected at the scatterer type detection position by the detecting.

7. The surface inspection apparatus as claimed in claim 6, which is communicably connected to the inspection condition presentation apparatus and a user terminal,
wherein the presenting the incidence condition candidate displays the incidence condition candidate, among the plurality of incidence condition candidates, on a display device of the user terminal.

8. The inspection condition presentation apparatus as claimed in claim 1, wherein the presenting the incidence condition candidate displays the incidence condition candidate, among the plurality of incidence condition candidates, on a display device.

9. A non-transitory computer-readable storage medium having stored therein a program which, when executed by a computer, causes the computer to perform a process including:
calculating an intensity distribution of scattered light when inspection light is irradiated on a surface of an inspection target in which scatterers of different types are present according to a plurality of incidence condition candidates;
presenting, to a user, an incidence condition candidate in which an intensity of the scattered light becomes a maximum, among the plurality of incidence condition candidates;
receiving an incidence condition instructed by the user in response to the incidence condition candidate presented to the user among the plurality of incidence condition candidates;
calculating a first distribution that is an intensity distribution of the scattered light when the inspection light is irradiated on the surface on which a first type of scatterer is present according to the incidence condition;
calculating a second distribution that is an intensity distribution of the scattered light when the inspection light is irradiated on the surface on which a second type of scatterer is present according to the incidence condition;
calculating a difference between the first distribution and the second distribution;
acquiring coordinates indicating an extreme value of the difference; and
presenting a detection condition candidate of the scattered light to the user based on an arrangement of the coordinates,
wherein the plurality of incidence condition candidates includes a wavelength of the inspection light.

10. The non-transitory computer-readable storage medium as claimed in claim 9, wherein the plurality of incidence condition candidates further includes at least one of an incident angle of the inspection light with respect to the surface, and a type of polarization of the inspection light.

11. An inspection condition presentation method implemented by a computer to perform a process including:
calculating an intensity distribution of scattered light when inspection light is irradiated on a surface of an inspection target in which scatterers of different types are present according to a plurality of incidence condition candidates;
presenting, to a user, an incidence condition candidate in which an intensity of the scattered light becomes a maximum, among the plurality of incidence condition candidates;
receiving an incidence condition instructed by the user in response to the incidence condition candidate presented to the user among the plurality of incidence condition candidates;
calculating a first distribution that is an intensity distribution of the scattered light when the inspection light is irradiated on the surface on which a first type of scatterer is present according to the incidence condition;
calculating a second distribution that is an intensity distribution of the scattered light when the inspection light is irradiated on the surface on which a second type of scatterer is present according to the incidence condition;
calculating a difference between the first distribution and the second distribution;
acquiring coordinates indicating an extreme value of the difference; and
presenting a detection condition candidate of the scattered light to the user based on an arrangement of the coordinates,
wherein the plurality of incidence condition candidates includes a wavelength of the inspection light.

12. The inspection condition presentation method as claimed in claim 11, wherein the plurality of incidence condition candidates further includes at least one of an incident angle of the inspection light with respect to the surface, and a type of polarization of the inspection light.

* * * * *